United States Patent
Park

(10) Patent No.: US 6,710,934 B2
(45) Date of Patent: Mar. 23, 2004

(54) COMPACT ZOOM LENS SYSTEM

(75) Inventor: Young-Woo Park, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 10/244,446

(22) Filed: Sep. 17, 2002

(65) Prior Publication Data

US 2003/0189761 A1 Oct. 9, 2003

(30) Foreign Application Priority Data

Sep. 18, 2001 (KR) ........................................ 2001-57560
May 9, 2002 (KR) ........................................ 2002-25599

(51) Int. Cl.$^7$ .............................................. G02B 15/14
(52) U.S. Cl. ...................................... 359/689; 359/683
(58) Field of Search ................................. 359/689, 683

(56) References Cited

U.S. PATENT DOCUMENTS

| | | | |
|---|---|---|---|
| 6,618,210 B2 * | 9/2003 | Noguchi et al. | 359/689 |
| 2002/0051301 A1 * | 5/2002 | Noguchi et al. | 359/689 |
| 2003/0072085 A1 * | 4/2003 | Mizuguchi et al. | 359/689 |

FOREIGN PATENT DOCUMENTS

| | | |
|---|---|---|
| JP | 56-123512 | 9/1981 |
| JP | 63-292106 | 11/1988 |
| JP | 5-173071 | 7/1993 |
| JP | 6-94996 | 4/1994 |
| JP | 06-094996 | 4/1994 |
| JP | 07-261083 | 10/1995 |
| JP | 11-023967 | 1/1999 |
| JP | 11-052246 | 2/1999 |
| JP | 11-084243 | 3/1999 |
| JP | 11-095103 | 4/1999 |
| JP | 11-149044 | 6/1999 |
| JP | 11-174310 | 7/1999 |
| JP | 11-174322 | 7/1999 |
| JP | 11-194274 | 7/1999 |
| JP | 11-211984 | 8/1999 |
| JP | 11-287953 | 10/1999 |
| JP | 2000-009997 | 1/2000 |

(List continued on next page.)

*Primary Examiner*—Georgia Epps
*Assistant Examiner*—M. Hasan
(74) *Attorney, Agent, or Firm*—Finnegan, Henderson, Farabow, Garrett & Dunner, L.L.P.

(57) ABSTRACT

Disclosed is a zoom lens system. The zoom lens system comprises: a first lens group of a negative refractive power, the first lens group comprising at least one lens of a negative refractive power and at least one lens of a positive refractive power, a second lens group of a positive refractive power, the second lens group comprising a first lens of a positive refractive power, a second lens of a positive refractive power, and a third lens of a negative refractive power; and a third lens group of a positive refractive power, the third lens group comprising at least one lens of a positive refractive power; where the first, the second, and the third lens groups move along an optical axis, and the zoom lens system satisfies the following conditions:

$$.4 \leq \frac{t_{II}}{\sqrt{f_W f_T}} \leq .6$$

and $$2.8 \leq \frac{f_T}{f_W} \leq 3.0,$$

where $f_w$ represents a total focal length at a wide-angle position; $f_t$ represents a total focal length at a telephoto position; and $t_{II}$ represents a total thickness of the second lens group.

22 Claims, 30 Drawing Sheets

FOREIGN PATENT DOCUMENTS

| | | |
|---|---|---|
| JP | 2000-089110 | 3/2000 |
| JP | 2000-111798 | 4/2000 |
| JP | 2000-137164 | 5/2000 |
| JP | 2000-284177 | 10/2000 |
| JP | 2001-066503 | 3/2001 |
| JP | 2001-141997 | 5/2001 |
| JP | 2001-215409 | 8/2001 |
| JP | 2001-242378 | 9/2001 |
| KR | 2000-0016965 | 9/2000 |
| KR | 2002-0074673 | 4/2002 |

\* cited by examiner

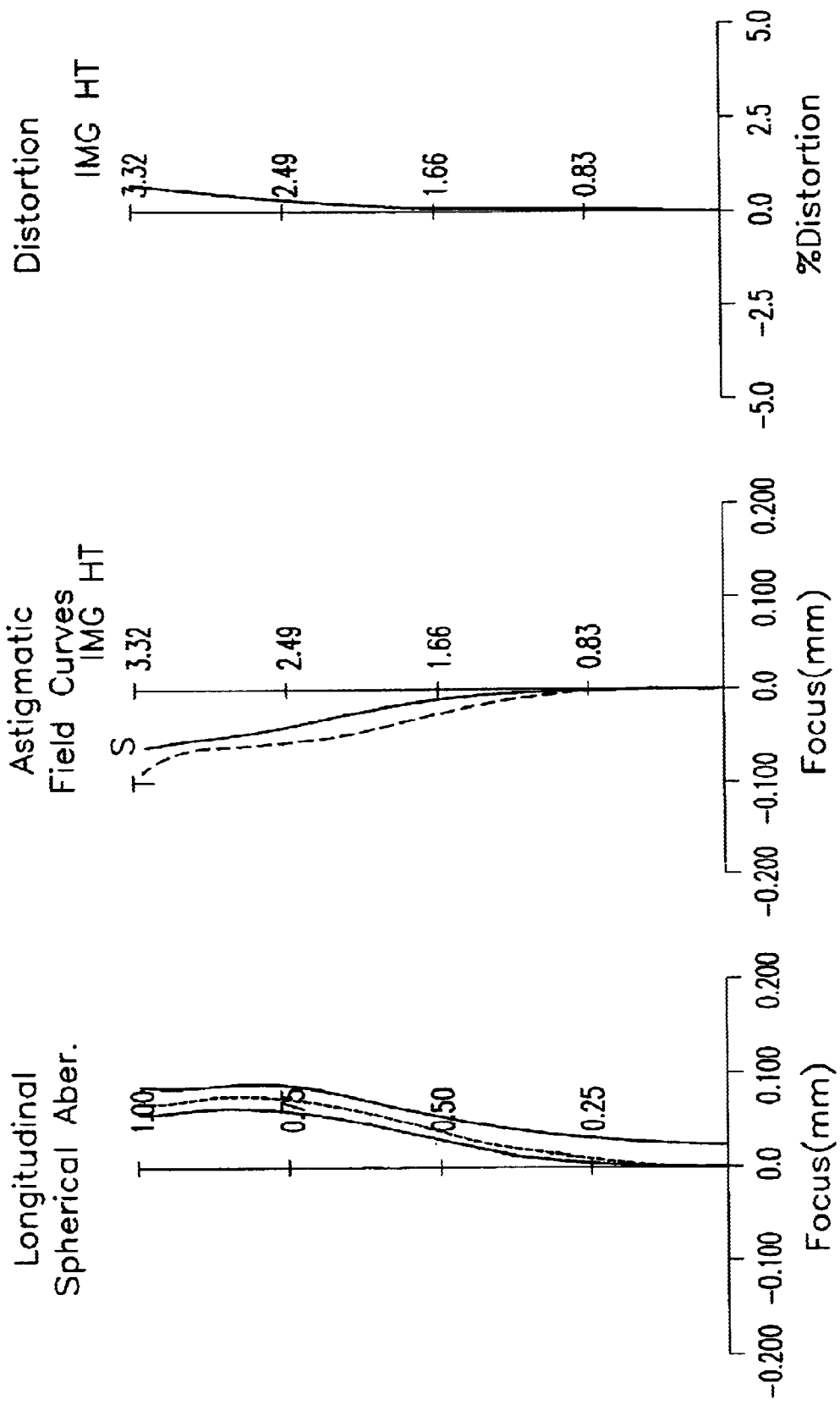
FIG.8B ABERRATION CURVES AT A TELEPHOTO POSITION

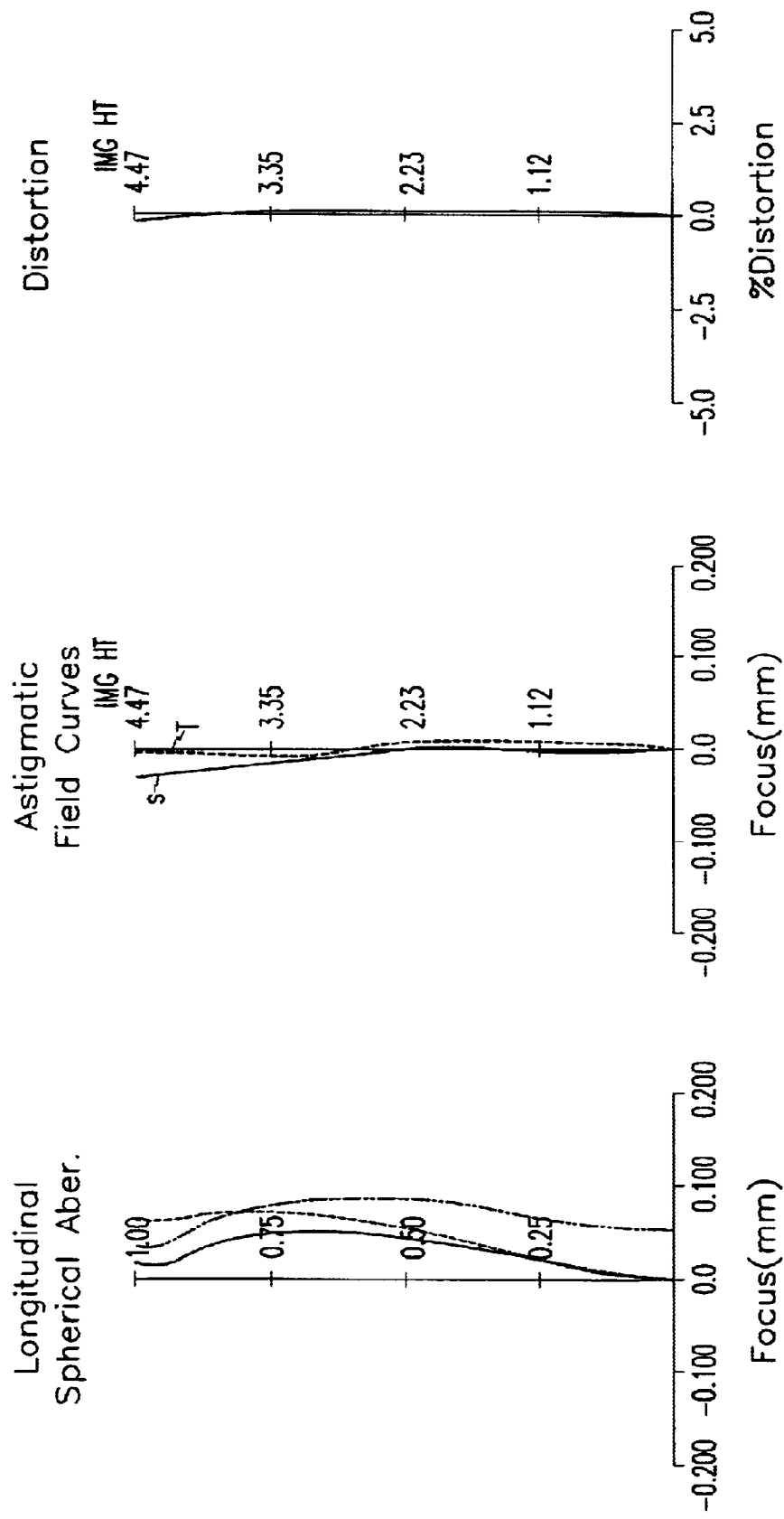
FIG.12B ABERRATION CURVES AT A TELEPHOTO POSITION

COMPACT ZOOM LENS SYSTEM

RELATED APPLICATIONS

The present application is related to and claims the priority of Korean Application No. PATENT-2001-0057560 filed Sep. 18, 2001, in the name of Young Woo PARK, and titled COMPACT ZOOM LENS and Korean Application No. PATENT-2002-0025599 filed May 9, 2002, in the name of Young Woo PARK, and titled COMPACT ZOOM LENS, the entire contents of which are fully incorporated herein by reference.

TECHNICAL FIELD

This invention relates generally to a compact zoom lens system used in a camera with a pick-up device such as a charge coupled device (CCD).

BACKGROUND

Popularization of electronic still cameras and video cameras with charge coupled device or solid-state pickup device has recently spread as they have become lighter in weight and lower in cost. Accordingly, demand is growing for a zoom lens system built into cameras with the pick-up device that has light weight and low cost.

An optical system used in a camera with a pick-up device utilizes a crystal filter to prevent the moiré effect. This effect occurs as a result of the periodic structure of the pick-up device. Consequently, the thickness and the position of the crystal filter must be considered when designing an optical system. Additionally, the telecentricity of rays of light inputted to an image plane becomes an important design parameter.

Zoom lens systems used in a camera with a pick-up device are disclosed in Japanese Publication Nos. Sho 56-123512, Hei 6-94996, Sho 63-292106, and Hei 5-173071. The zoom lens system of Japanese Publication No. Sho 56-123512 includes, when viewed from an object, a first lens group of negative refractive power and a second lens group of positive refractive power. The second lens group moves to vary the magnification of the zoom lens system. The first lens group moves to compensate the movement of an image point due to the variation of the magnification. However, when zooming the first and second lens groups move along an optical axis. Subsequently, as magnification changes, the total length of the zoom lens system increases. This results in the complex barrel structure. It also increases difficulty of achieving a zoom ratio or magnification ratio of over 2. Finally, it makes difficult to create a compact zoom lens system.

The zoom lens system of Japanese Publication No. Hei 6-94996 includes three lens groups. To compensate for various kinds of aberration occurring due to the variation in magnification, a third lens group of a negative or positive refractive power is located on the side of a second lens group facing an image. As a result, a magnification ratio increases and the size of the zoom lens system remains compact. When zooming, the first and second lens groups move along an optical axis to vary the magnification, and the third lens group stays fixed. However, the total length of the zoom lens system varies, and the magnification ratio does not exceed 2.0.

The zoom lens system of Japanese Publication No. Sho 63-292106 is an optical system in which the total length of the zoom lens system does not vary during zooming. The optical system includes a first lens group which is fixed during the zooming and which has a negative refractive power, a second lens group of a positive refractive power, and a third lens group of a positive refractive power. The second and third lens groups move axially when zooming. However, since the second and the third lens groups move toward an object when zooming, a problem arises. More specifically, the total length of the zoom lens system should be large enough to compensate optical performance of the zoom lens system at a wide-angle position. As a result, the size of the zoom lens system increases, and thereby makes it difficult to build a compact zoom lens system.

The zoom lens system of Japanese Publication No. Hei 5-173071 includes, when viewed from an object, a first lens group of a negative refractive power, a second lens group of a positive refractive power, a third lens group of a positive refractive power, and a fourth lens group of a positive refractive power. However, since all the lens groups move when zooming, this structure results in the complex barrel structure.

It is therefore desirable to provide a compact zoom lens system that has a high magnification ratio with a simple construction of the optical system and which may be used in a camera with a pick-up device. It is also desirable to provide a zoom lens system that has good optical performance due to well compensating chromatic aberrations.

SUMMARY

There is provided a compact zoom lens system, when viewed from an object side, comprising a first lens group of a negative refractive power, the first lens group comprising at least one lens of a negative refractive power and one lens of a positive refractive power; a second lens group of a positive refractive power, the second lens group comprising a first lens of a positive refractive power, a second lens of a positive refractive power, and a third lens of a negative refractive power; and a third lens group of a positive refractive power, the third lens group comprising at least a lens of a positive refractive power, wherein the first, the second, and the third lens groups move along an optical axis. The zoom lens system satisfies the following conditions:

$$0.4 \leq \frac{t_{II}}{\sqrt{f_W f_T}} \leq 0.6 \text{ and } 2.8 \leq \frac{f_T}{f_W} \leq 3.0,$$

wherein $f_W$ represents a total focal length at a wide-angle position;

$f_T$ represents a total focal length at a telephoto position; and $t_{II}$ represents a total thickness of the second lens group.

The zoom lens system further satisfies the following conditions:

$$1 \leq \frac{L_{II}}{\sqrt{f_W f_T}} \leq 1.5 \text{ and } 1.7 \leq \frac{f_{III}}{\sqrt{f_W f_T}} \leq 3,$$

wherein $f_{III}$ represents a focal length of the third lens group; and $L_{II}$ represents an amount the second lens group moves from the wide-angle position to the telephoto position. Also, the zoom lens system further satisfies the following condition:

$$0.4 \le \left|\frac{f_{I(-)}}{f_{I(+)}}\right| \le 0.6,$$

wherein $f_{I(-)}$ represents a focal length of a lens which has a negative refractive power in the first lens group; and $f_{I(+)}$ represents a focal length of a lens which has a positive refractive power in the first lens group.

There is also provided a compact zoom lens system, when viewed from an object side, comprising a first lens group of a negative refractive power; a second lens group of a positive refractive power, the second lens group comprising a first lens of a positive refractive power, a second lens of a positive refractive power, and a third lens of a negative refractive power, wherein two lenses among the first lens, the second lens and, the third lens are cemented; and a third lens group of a positive refractive power, wherein the first, the second, and the third lens groups move along an optical axis when zooming from a wide-angle position to a telephoto position. The zoom lens system satisfies the following conditions:

$$0.8 \le \frac{D_{IIW}}{f_W} \le 1.2 \text{ and } 0.4 \le \frac{t_{II}}{\sqrt{f_W f_T}} \le 0.6,$$

wherein $D_{IIW}$ represents a distance between the second lens group and the third lens group at the wide-angle position.

There is also provided a compact zoom lens system, when viewed from an object side, comprising a first lens group of a negative refractive power; a second lens group of a positive refractive power, the second lens group comprising a first lens of a positive refractive power, a second lens of a positive refractive power, and a third lens of a negative refractive power; and a third lens group of a positive refractive power, wherein the first, the second, and the third lens groups move along an optical axis when zooming from a wide-angle position to a telephoto position. The zoom lens system satisfies the following conditions:

$$-0.2 \le \frac{L_{III}}{\sqrt{f_W f_T}} \le 0.1, \text{ and } 0.8 \le \frac{D_{IIW}}{f_W} \le 1.2, \text{ and } 0.4 \le \frac{t_{II}}{\sqrt{f_W f_T}} \le 0.6,$$

wherein $L_{III}$ represents an amount the third lens group moves from the wide-angle position to the telephoto position.

The zoom lens systems further satisfies the following condition:

$$0.25 \le |n_{II1} - n_{II2}| \le 0.4,$$

wherein $n_{II1}$ represents a refractive index of the first positive lens in the second lens group; and $n_{II2}$ represents a refractive index of the second positive lens in the second lens group.

In the zoom lens systems, the third lens group may comprise one lens of a positive refractive power. The first lens group and the second lens group may comprise at least one aspherical surface and two lenses among the first lens, the second lens, and the third lens of the second lens group may be cemented.

Additional features and advantages will be set forth in part in the description which follows, and in part will be obvious from the description, or may be learned by practice of the claims. The advantages will be realized and attained by means of the elements and combinations particularly pointed out in the appended claims.

It is to be understood that both the foregoing general description and the following detailed description are exemplary and explanatory only and are not restrictive of the appended claims.

BRIEF DESCRIPTION OF THE DRAWINGS

FIGS. 8a and 8b show aberration curves of the compact zoom lens system at a wide-angle position and at a telephoto position respectively.

FIGS. 12a and 12b show aberration curves of the compact zoom lens system at a wide-angle position and at a telephoto position respectively.

DETAILED DESCRIPTION

Figure 1:
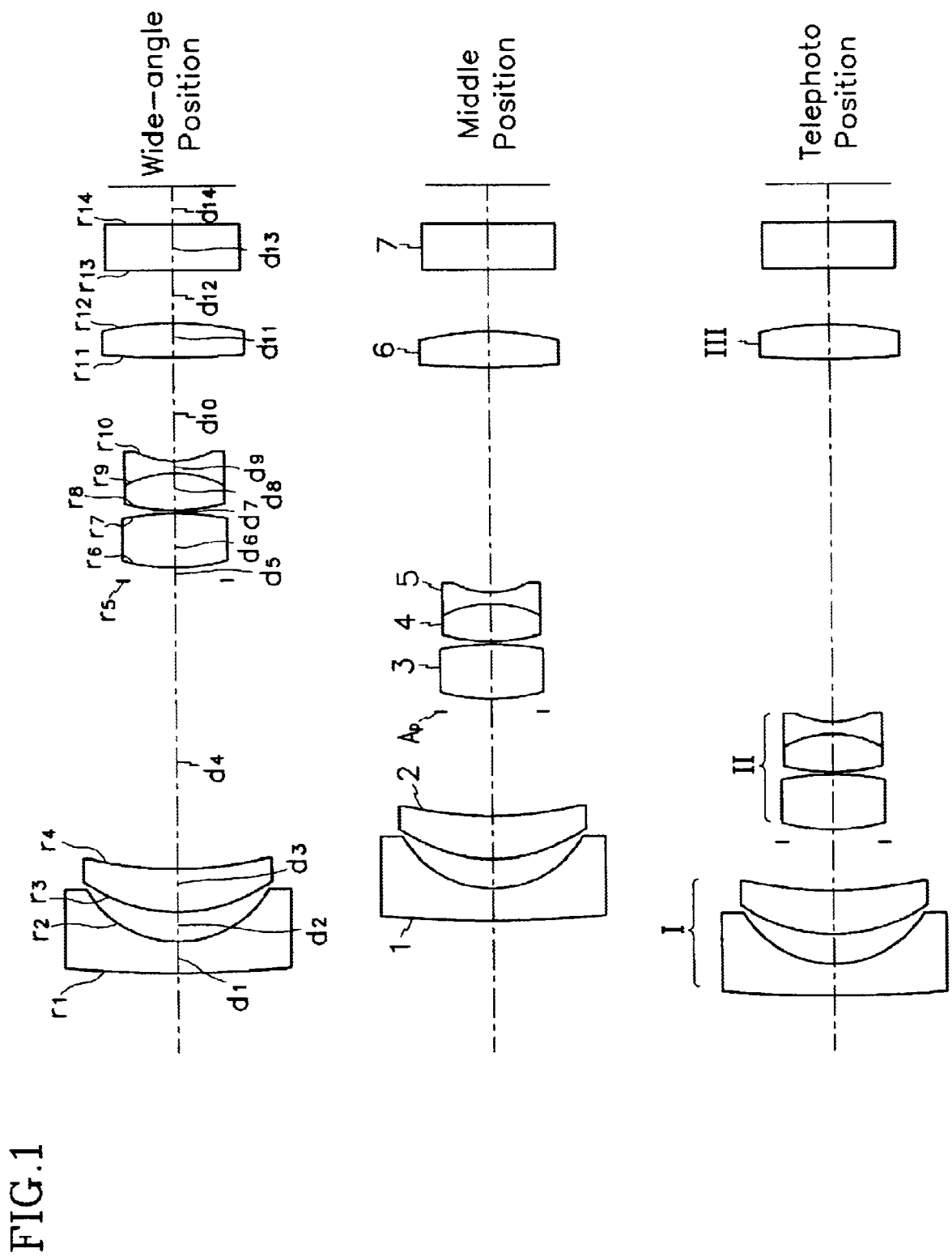
FIG. 1 is a side view of a compact zoom lens system at the respective zoom positions.

Referring now to the drawings, in which the same reference numbers will be used throughout the drawings to refer to the same or like parts, a zoom lens system with a high magnification ratio and simple structure that can be used as a photographing optical system of a camera using a pick-up device will be described. Moreover, the drawings and description are to be regarded as illustrative in nature, and not restrictive.

The construction of the zoom lens system is showed in FIGS. 1, 3, 5, 7, 9, 11, 13, 15, 17, and 19. As shown on those drawings, the zoom lens system includes, when viewed from an object, a first lens group I of a negative refractive power, a second lens group II of a positive refractive power, and a third lens group III of a positive refractive power. An aperture Ap is positioned between the first lens group I and the second lens group II.

The first lens group I includes a lens of a negative refractive power and a lens of a positive refractive power, and it may include at least one lens with an aspherical surface. The second lens group includes, when viewed from the object side, a lens of a positive refractive power, a lens of a positive refractive power, and a lens of a negative refractive power, wherein a lens of a positive refractive power and a lens of a negative refractive power may be cemented. Accordingly, the second lens group II may include at least one cemented lens. Also, the second lens group II may include at least one lens with an aspherical surface. The third lens group III includes at least one lens of a positive refractive power.

As shown in FIGS. 1, 3, 5, 7, 9, 11, 13, 15, 17, and 19, in the zoom lens system where arrangement of the refractive power is negative, positive, positive (NPP), each lens group moves from a wide-angle position to a telephoto position when zooming. At this time, the magnification is varied by decreasing an interval between the first lens group I and the second lens group II, and by increasing an interval between the second lens group II and the third lens group III. Detailed construction of each lens group and the operation of the above discussed compact zoom lens system will be described below.

The second lens group II moves along an optical axis to vary the magnification of the zoom lens system, and the first lens group I and the third lens group III move to compensate the movement of an image plane that occurs in zooming, so that the zoom lens system has a high magnification ratio with a compact structure. More specifically, the first lens group I or the first lens group I and the third lens group III move to compensate the movement of the image plane that occurs in zooming. The first lens group I, or the third lens group III moves to perform the focusing. When the first lens group I move to perform the focusing, it is advantageous that a position of the focusing lens group is not changed. When the third lens group III moves to perform the focusing, since the moving lens group is small, it becomes easy to make the zoom lens system compact.

At the same time, the first lens group I of a negative refractive power and the second lens group II are disposed on the object side, so that a wide angle of more than 60° and a sufficient intensity of radiation are obtained. More specifically, a lens with a high index of dispersion is arranged in the first lens group I. That allows to achieve chromatic aberration of magnification required to obtain the high resolution decrease.

A convex lens of a positive refractive power is arranged in the third lens group III, which makes a suitable back focal length obtainable. Accordingly, it is capable of reaching the telecentricity considered in using an image-forming medium such as a pick-up device, that is, it is able to locate the exit pupil as far from the pick-up device as possible so that a central ray of light from the periphery image is inputted to the pick-up device at the right-angle.

Also, in the first lens group I, from the object, the refractive powers of the compensated lenses are arranged in order of a negative refractive power and a positive refractive power, wherein the lens of a positive refractive power is made of a material with a high index of dispersion, so that the chromatic aberration of magnification is sufficiently compensated even in an optical system with a high magnification ratio of over 3.0.

The first lens group I includes pertinently aspherical surfaces, which reduces distortion to a minimum and allows to achieve good conditions for forming an image suitable for an optical system. In the second lens group II, from the object, the refractive powers of the compensated lenses are arranged in order of a positive refractive power and a negative refractive power, so that good optical performance can be obtained for the whole picture, and sufficient performance of forming an image suitable for the pick-up device can be obtained.

In an optical system in which each lens group has a lens compensated with negative refractive power and a lens compensated with positive refractive power, in this order, when viewed from the object, the intervals between each lens group greatly affect the optical performance because of the high refractive power of the second lens group II. Accordingly, presence of a lens of a high positive refractive power and a lens of a high negative refractive power among lenses of the second lens group II reduces the variation of performance to a minimum due to the interval and the eccentricity of the lens.

The zoom lens system according to the present invention having the above-described features satisfies condition (1):

$$1 \leq \frac{L_{II}}{\sqrt{f_W f_T}} \leq 1.5,$$

wherein $f_W$ represents a total focal length at a wide-angle position;

$f_T$ represents a total focal length at a telephoto position; and $L_{II}$ represents an amount the second lens group II moves from the wide-angle position to the telephoto position.

Condition (1) defines a ratio of the amount of movement of the second lens group II to a composition focal length at the wide-angle position and at the telephoto position so as to obtain a compact zoom lens system by sufficiently determining the amount of movement of the second lens group II when zooming.

If the upper limit of the condition (1) is exceeded, the refractive power of the second lens group II decreases which in turn increases the amount of movement of the second lens group II from the wide-angle position to the telephoto position. As a result, the total length of the zoom lens system increases. Consequently, it is difficult to make a compact zoom lens system. If the lower limit of the condition (1) is exceeded, the refractive power of the second lens group II increases. As a result, a sufficient back focal length at the wide-angle position cannot be obtained, making it difficult to compensate spherical aberration, coma aberration, and astigmatism at the telephoto position.

The zoom lens system according to the present invention further satisfies condition (2):

$$1.7 \leq \frac{f_{III}}{\sqrt{f_W f_T}} \leq 3,$$

wherein $f_{III}$ represents a focal length of the third lens group III.

Condition (2) defines a ratio of the focal length of the third group III to a focal length at the wide-angle position and at the telephoto position to obtain the telecentricity for the optical system suitable for an image-forming medium such as a pick-up device. If the upper limit of condition (2) is exceeded, the refractive power of the third lens group III decreases, making it difficult for the zoom lens system to have the telecentricity. More specifically, when the refractive power of the third lens group III decreases, it is difficult to obtain the telecentricity since the position of the exit pupil moves closer to the image plane. If the lower limit of condition (2) is exceeded, the refractive power of the third lens group III increases, making it difficult to control astigmatism. Accordingly, good aberration compensation is not performed.

The zoom lens system according to the present invention further satisfies condition (3):

$$0.4 \leq \frac{t_{II}}{\sqrt{f_W f_T}} \leq 0.6,$$

wherein $t_{II}$ represents a total thickness of the second lens group II.

Condition (3) defines a ratio of the total thickness of the second lens group II to the composite focal length at the wide-angle position and at the telephoto position. If the upper limit of condition (3) is exceeded, the total length of the optical system increases, that is, the total length of the zoom lens system increases when a barrel is located inside the camera. Subsequently, it is difficult to make a compact zoom lens system (or camera). If the lower limit of condition (3) is exceeded, the refractive power of the second lens group II increases, making it difficult to obtain a suitable back focal length at the wide-angle position.

The zoom lens system according to the present invention satisfies condition (4):

$$0.4 \leq \left|\frac{f_{I(-)}}{f_{I(+)}}\right| \leq 0.6,$$

wherein $f_{I(-)}$ represents a focal length of a lens (can be referred to as a "negative lens") which has a negative refractive power among lenses of the first lens group I; and $f_{I(+)}$ represents a focal length of a lens (can be referred to as a "positive lens") which has a positive refractive power among lenses of the first lens group I.

Condition (4) defines a ratio of a focal length of the positive lens to a focal length of the negative lens in the first lens group I. If the upper limit of condition (4) is exceeded, the refractive power of the positive lens increases, making it difficult to compensate distortion and astigmatism. If the lower limit of condition (4) is exceeded, the refractive power of the negative lens increases, making it difficult to compensate the chromatic aberration of magnification.

The zoom lens system according to the present invention further satisfies condition (5):

$$2.8 \leq \frac{f_T}{f_W} \leq 3.0.$$

Condition (5) relates to a magnification ratio needed to obtain a high magnification ratio of 2.8 to 3. If condition (5) is not satisfied, the magnification ratio to be implemented by the zoom lens system cannot be achieved.

The zoom lens system according to the present invention further satisfies condition (6):

$$-0.2 \leq \frac{L_{III}}{\sqrt{f_W f_T}} \leq 0.1,$$

wherein $L_{III}$ represents the amount of movement of the third lens group III from the wide-angle position to the telephoto position.

Condition (6) defines a ratio of the amount of movement of the third lens group III to the composite focal length at the wide-angle position and at the telephoto position, that is, condition (6) relates to the amount of movement of the third lens group III when focusing according to the position of the object. When focusing is performed according to the moving of the third lens group III, an amount of movement of the focusing lens group, that is, the third lens group III at the telephoto position, becomes greater than that of the third lens group III at the wide-angle position. Accordingly, if the upper limit of condition (6) is exceeded, the position of the third lens group III at the telephoto position becomes far from the image plane, making it difficult to make the structure of the camera compact when the barrel is located inside. If the lower limit of condition (6) is exceeded, the third lens group III at the wide-angle position moves far from the image plane, making it difficult to achieve a compact structure when the barrel is located inside the camera.

The zoom lens system according to the present invention further satisfies condition (7):

$$0.8 \leq \frac{D_{IIW}}{f_W} \leq 1.2,$$

wherein $D_{IIW}$ represents a distance between the second lens group and the third lens group at the wide-angle position.

Condition (7) defines a ratio of a distance on the optical axis between the second lens group II and the third lens group III to the total focal length at the wide-angle position. If the upper limit of condition (7) is exceeded, the second lens group II moves to a position further far from the image plane, increasing the difficulty of making the zoom lens system compact. If the lower limit of condition (7) is exceeded, the position of the exit pupil moves closer to the image plane, making it difficult to obtain the telecentricity.

The zoom lens system according to the present invention further satisfies condition (8):

$$0.25 \leq |n_{II1} - n_{II2}| \leq 0.4,$$

wherein $n_{II1}$ represents a refractive index of the lens (will be referred to as "first positive lens," and it may be third lens 3 (FIG. 1) as an example) nearest to the object side among the positive lenses of the second lens group II; and $n_{H2}$ represents a refractive index of the lens (will be referred to as "second positive lens," and it may be the fourth lens 4 (FIG. 1) as an example) which is positioned behind the first positive lens among the positive lenses of the second lens group II.

If condition (8) is not satisfied, the aberration characteristics for good focusing performance may not be obtained. Also, this makes it difficult to compensate a chromatic aberration of magnification.

The embodiments satisfying conditions (1) to (8) will now be described. In the tables below, all units of length are in millimeters, and the following variables are used:

r(I=1–14) represents the radius of curvature of a refractive surface;

d(I=1–14) represents the thickness of a lens or the distance between the lenses;

nd represents the d-line refractive index of a lens; and v represents the Abbe number of a lens.

In the first embodiment, number F ranges from 2.84 to 5.01, the focal length varies from 5.91 mm to 17.10 mm, and the viewing angle varies from 60.67° to 21.69°. In the middle position, number F is 3.88, the focal length is 11.53 mm, and the viewing angle is 31.93°. As shown in FIG. 1, in the zoom lens system according to the first embodiment, the first lens group I includes a first lens 1 with a negative refractive power and a concave surface facing the image plane, and a second lens 2 with a positive refractive power and a meniscus lens of a concave surface facing the image plane. The second lens group II includes third lens 3 with a positive refractive power and biconvex surfaces, fourth lens 4 with a positive refractive power and biconvex surfaces, and a fifth lens 5 with a negative refractive power and biconcave surfaces. Fifth lens 5 is cemented to fourth lens 4. The third lens group III includes a sixth lens 6 with a positive refractive power and a convex surface facing the object side. Also, optical filter 7 is positioned at the side of image plane of sixth lens 6.

Data for the first embodiment is listed in Table 1. "Surface No." corresponds to the numerical subscripts shown in FIG. 1, e.g. $r_1$, $r_2$, $d_1$, $d_2$, etc.

TABLE 1

| Surface No. | Radius of Curvature (r) | Distance (d) (mm) | Refractive index (nd) | Abbe Number (v) |
|---|---|---|---|---|
| 1 | 97.86200 | 1.500000 | 1.80600 | 40.70 |
| *2 | 4.80500 | 1.460000 | | |
| 3 | 8.01300 | 2.150000 | 1.84700 | 23.80 |
| 4 | 21.56000 | $d_4$ | | |
| 5 | ∞ | 0.650000 | | |
| *6 | 8.40900 | 2.720000 | 1.51500 | 63.10 |
| *7 | −10.78100 | 0.180000 | | |
| 8 | 13.18300 | 1.880000 | 1.80400 | 46.50 |
| 9 | −5.42700 | 0.600000 | 1.64800 | 33.80 |
| 10 | 4.70500 | $d_{10}$ | | |
| 11 | 83.14300 | 1.660000 | 1.51500 | 63.10 |
| *12 | −14.85200 | $d_{12}$ | | |
| 13 | ∞ | 2.350000 | 1.51700 | 64.20 |
| 14 | ∞ | 1.700000 | | |

Where * represents an aspherical surface. The aspherical lenses of the compact zoom lens system according to the embodiment are described by the following equation:

$$x = \frac{c^2 y^2}{1 + \sqrt{1 - (K+1)c^2 y^2}} + Ay^4 + By^6 + Cy^8 + Dy^{10},$$

wherein x represents the distance from the lens vertex to an optical axis;

y represents the radial distance from the optical axis;

c represents the inverse radius of curvature;

K represents the conic constant; and

A, B, C, and D represent aspherical coefficients.

The coefficients of the aspherical surfaces calculated by the above equation are shown in the following Table 2. In the first preferred embodiment, the surface facing the image plane of first lens 1 of the first lens group I, the surfaces facing the image plane and the object of third lens 3 of the second lens group II, and the surface facing the image plane of sixth lens 6 of the third lens group III are aspherical surfaces.

TABLE 2

| Aspherical coefficients of the second surface | | Aspherical coefficients of the sixth surface | |
|---|---|---|---|
| K | −0.623771 | K | −3.874690 |
| A | −0.331139E−04 | A | −0.281393E−03 |
| B | 0.479755E−05 | B | −0.364877E−04 |
| C | −0.219070E−06 | C | −0.117607E−05 |
| D | 0.109278E−08 | D | 0.306879E−07 |
| Aspherical coefficients of the seventh surface | | Aspherical coefficients of the twelfth surface | |
| K | 0.030886 | K | −23.847538 |
| A | 0.157658E−05 | A | −0.638389E−03 |
| B | −0.110920E−04 | B | 0.249517E−04 |
| C | −0.179964E−05 | C | −0.334747E−06 |
| D | 0.120179E−06 | D | −0.101431E−07 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 3.

TABLE 3

| Surface No. | Wide-angle position | Middle position | Telephoto position |
|---|---|---|---|
| $d_4$ | 14.504 | 5.277 | 2.450 |
| $d_{10}$ | 5.275 | 11.341 | 18.365 |
| $d_{12}$ | 2.589 | 3.081 | 2.611 |

Figure 2A:
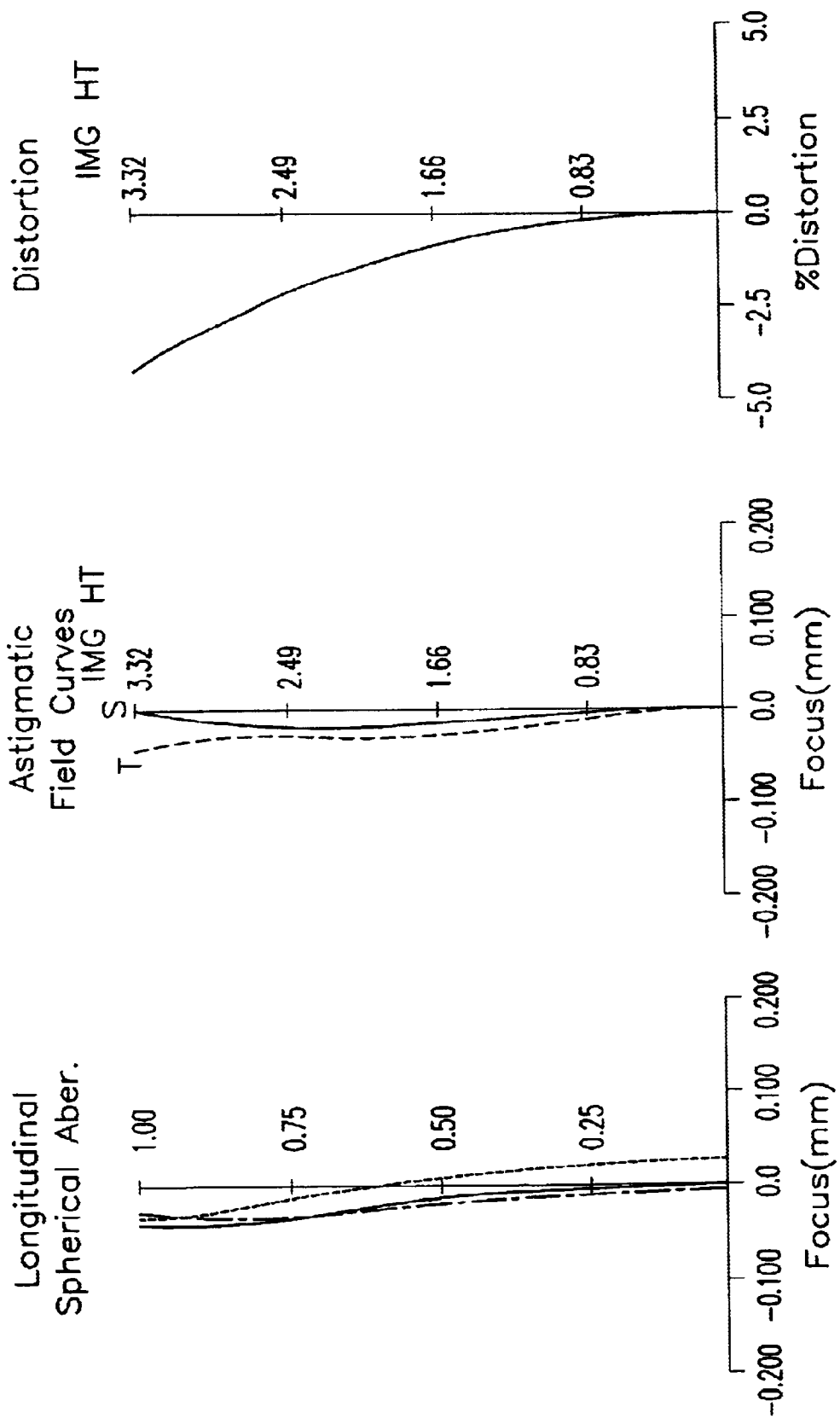
FIGS. 2a and 2b show aberration curves of the compact zoom lens system at a wide-angle position and at a telephoto position respectively.
Figure 2B:
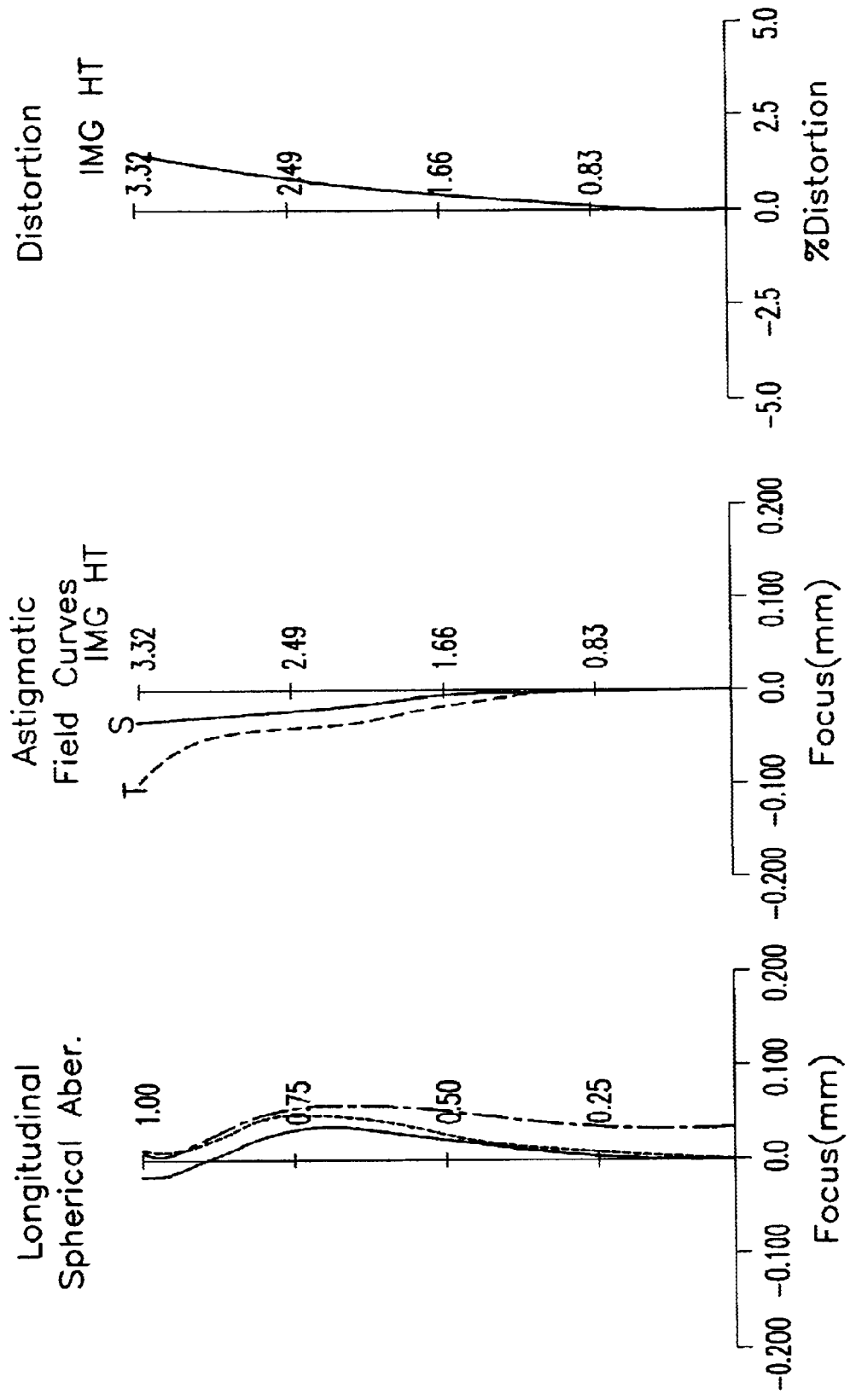

FIGS. 2a and 2b illustrate superior aberration characteristics of the first embodiment at a wide-angle position and at a telephoto position respectively.

In the second embodiment, number F ranges from 2.79 to 4.81, the focal length varies from 5.90 mm to 17.06 mm, and the viewing angle varies from 60.69° to 21.71°. In the middle position, number F is 3.78, the focal length is 11.76 mm, and the viewing angle is 31.33°.

Figure 3:
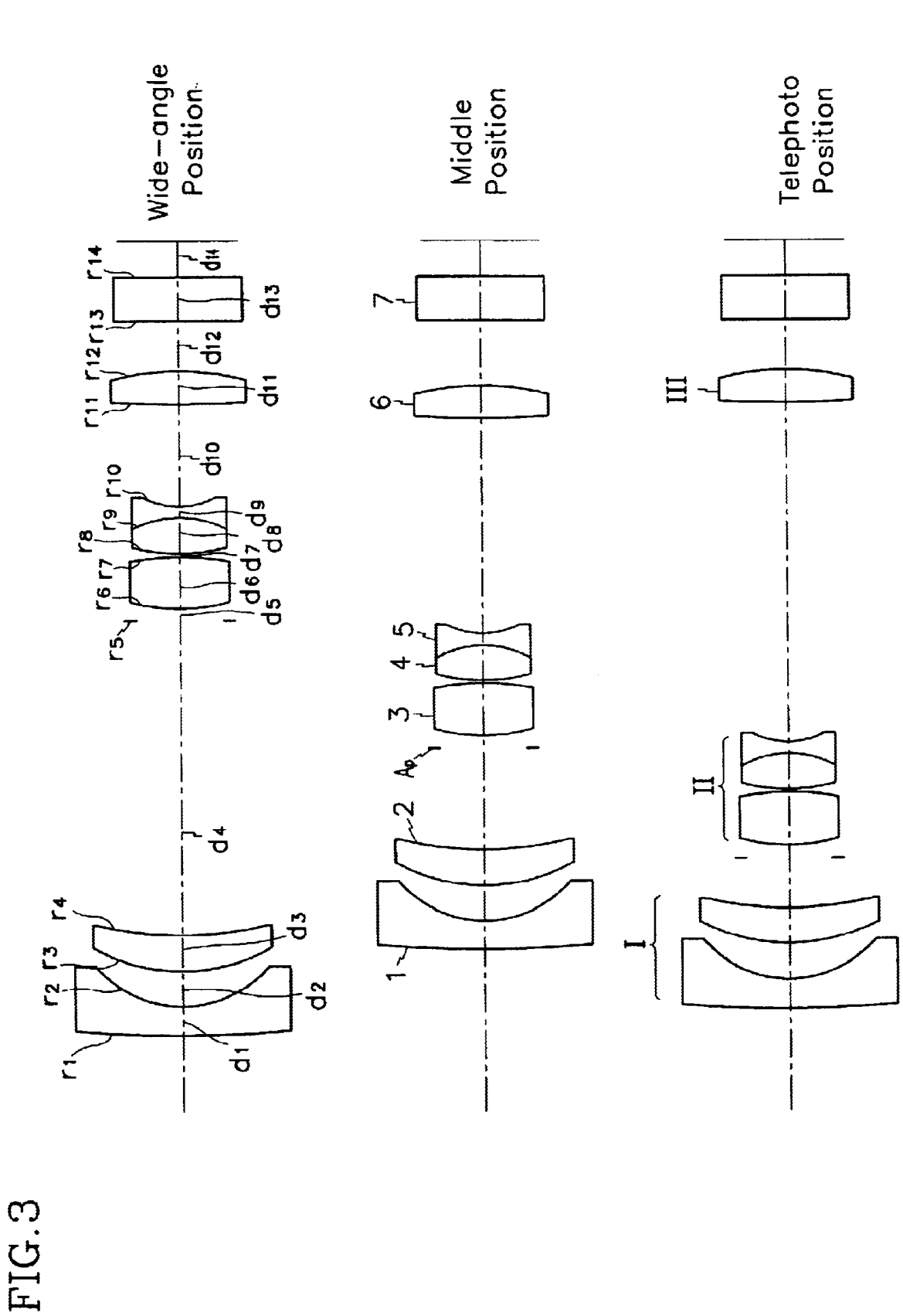
FIG. 3 is a side view of a compact zoom lens system at respective zoom positions.

FIG. 3 illustrates the structure of the zoom lens system according to the second embodiment. As shown in FIG. 3, the zoom lens system according to the second embodiment is constructed in the same manner as the zoom lens system of the first embodiment. Data for the second embodiment is listed in Table 4.

TABLE 4

| Surface No. | Radius of Curvature (r) | Distance (d) (mm) | Refractive index (nd) | Abbe Number (v) |
|---|---|---|---|---|
| 1 | 86.83600 | 1.300000 | 1.75100 | 45.40 |
| *2 | 5.19200 | 1.900000 | | |
| 3 | 8.96900 | 1.900000 | 1.84700 | 23.80 |
| 4 | 19.52700 | $d_4$ | | |
| 5 | ∞ | 0.6500000 | | |
| *6 | 8.90800 | 2.720000 | 1.51500 | 63.10 |
| *7 | −13.18500 | 0.130000 | | |
| 8 | 12.13900 | 1.970000 | 1.80400 | 46.50 |
| 9 | −5.37400 | 0.600000 | 1.64800 | 33.80 |
| 10 | 4.84100 | $d_{10}$ | | |
| *11 | 46.66500 | 1.630000 | 1.51500 | 63.10 |
| 12 | −18.40500 | $d_{12}$ | | |
| 13 | ∞ | 2.350000 | 1.51700 | 64.20 |
| 14 | ∞ | 1.700000 | | |

In the second preferred embodiment, the surface facing the image plane of first lens 1 of first lens group I, the surface facing the object of third lens 3 of second lens group II, and the surface facing the object of sixth lens 6 of third lens group III are aspherical surfaces. The coefficients of the aspherical surfaces according to the second embodiment are shown in the following Table 5.

TABLE 5

| | Aspherical coefficients of the second surface | Aspherical coefficients of the sixth surface | Aspherical coefficients of the eleventh surface |
|---|---|---|---|
| K | −0.524595 | −3.918027 | −683.259720 |
| A | −.427005E−04 | −0.227150E−03 | 0.511578E−03 |
| B | 0.498214E−05 | −0.205677E−04 | −0.551033E−04 |
| C | −0.127066E−06 | −0.676607E−07 | 0.285737E−05 |
| D | −0.365007E−09 | −0.348492E−07 | −0.607086E−07 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 6.

TABLE 6

| Surface No. | Wide angle position | Middle position | Telephoto position |
|---|---|---|---|
| $d_4$ | 16.375 | 5.429 | 2.471 |
| $d_{10}$ | 5.535 | 11.342 | 17.988 |
| $d_{12}$ | 2.584 | 3.269 | 2.632 |

Figure 4A:
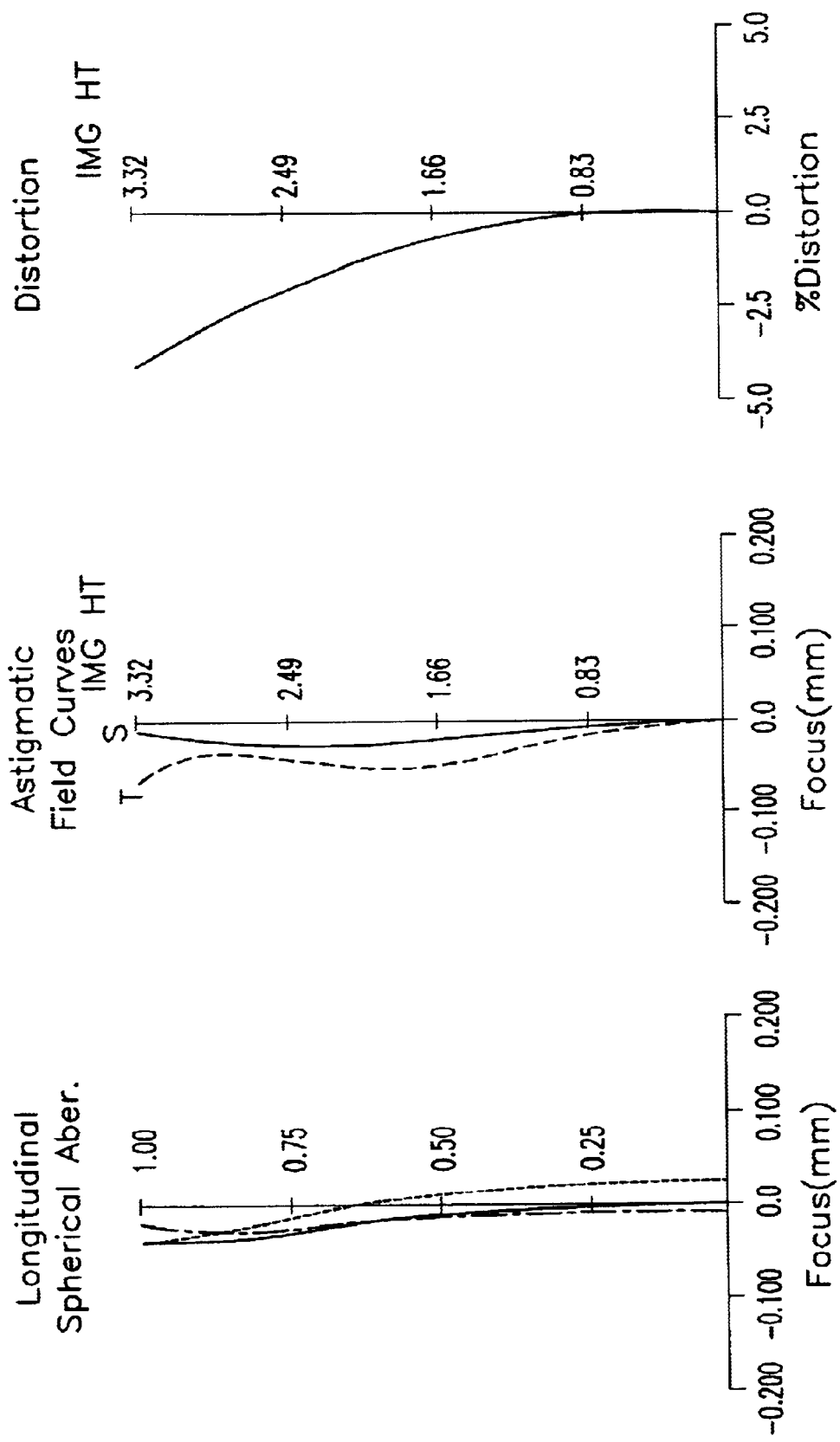
FIGS. 4a and 4b show aberration curves of the compact zoom lens system at a wide-angle position and at a telephoto position respectively.
Figure 4B:
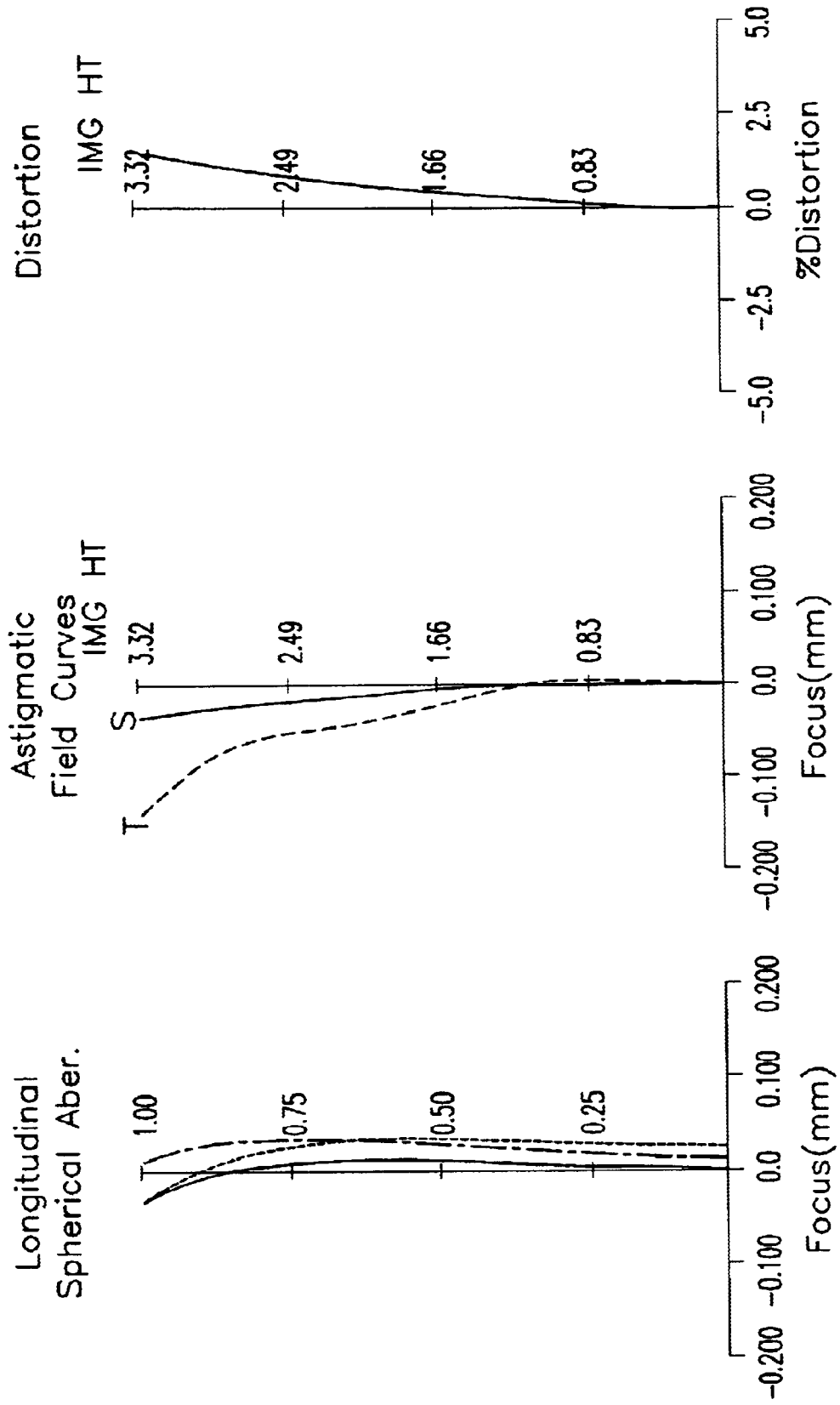

FIGS. 4a and 4b illustrate superior aberration characteristics of the second embodiment at a wide-angle position and at a telephoto position respectively.

In the third embodiment, number F ranges from 2.84 to 4.97, the focal length ranges from 5.91 mm to 17.11 mm, and the viewing angle ranges from 60.53° to 21.81°. In the middle position, number F is 3.90, the focal length is 11.51 mm, and the viewing angle is 32.15° respectively.

Figure 5:
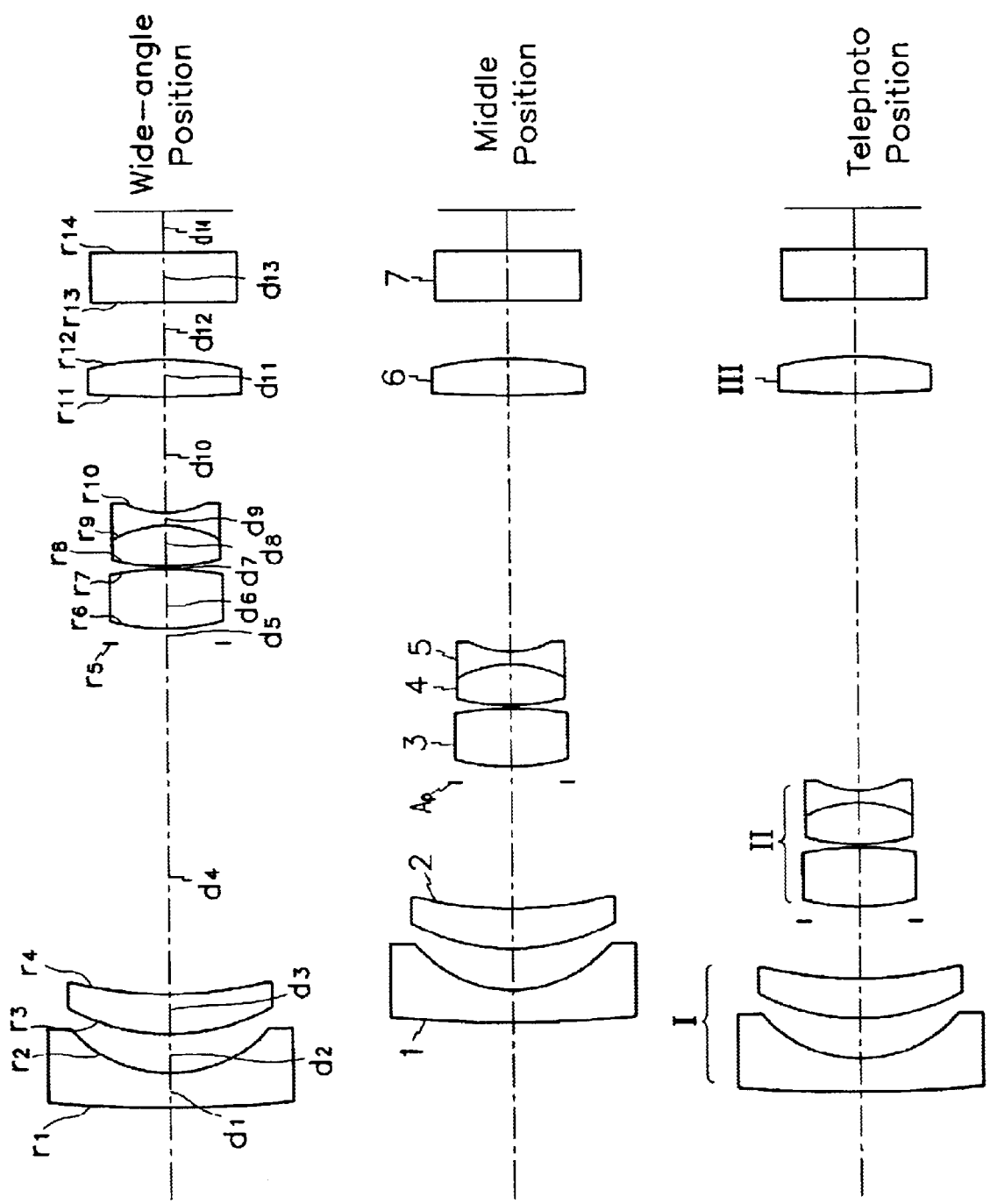
FIG. 5 is a side view of the compact zoom lens system at respective zoom positions.

FIG. 5 illustrates the structure of the zoom lens system according to the third embodiment. As shown in FIG. 5, the zoom lens system according to the third embodiment is constructed in the same manner as the zoom lens system of the first embodiment. Data for the third embodiment is listed in Table 7.

TABLE 7

| Surface No. | Radius of Curvature (r) | Distance (d) (mm) | Refractive index (nd) | Abbe Number (v) |
|---|---|---|---|---|
| 1 | 250.00000 | 1.300000 | 1.75100 | 45.40 |
| *2 | 5.06300 | 1.660000 | | |
| 3 | 8.74000 | 2.090000 | 1.78500 | 25.70 |
| 4 | 27.75500 | $d_4$ | | |
| 5 | ∞ | 0.640000 | | |
| *6 | 8.28300 | 2.700000 | 1.51500 | 63.10 |
| 7 | −14.69900 | 0.100000 | | |
| 8 | 11.28000 | 1.950000 | 1.80400 | 46.50 |
| 9 | −5.37700 | 0.600000 | 1.64800 | 33.80 |
| 10 | 4.45700 | $d_{10}$ | | |
| 11 | 37.50000 | 1.740000 | 1.51500 | 63.10 |
| *12 | −16.76800 | $d_{12}$ | | |
| 13 | ∞ | 2.350000 | 1.51700 | 64.20 |
| 14 | ∞ | 1.700002 | | |

In the third embodiment, the surface facing the image plane of first lens 1 of the first lens group I, the surface facing the object of third lens 3 of the second lens group II, and the surface facing the image plane of sixth lens 6 of the third lens group III are aspherical surfaces. The coefficients of the aspherical surfaces according to the third embodiment are shown in the following Table 8.

TABLE 8

| | Aspherical coefficients of the second surface | Aspherical coefficients of the sixth surface | Aspherical coefficients of the twelfth surface |
|---|---|---|---|
| K | −0.697695 | −3.016323 | −35.579202 |
| A | 0.104106E−04 | −0.227999E−03 | −0.725275−03 |
| B | 0.270822E−05 | −0.257731E−04 | 0.299853E−04 |
| C | −0.137393E−06 | 0.6334240E−06 | −0.706392E−06 |
| D | 0.133649E−08 | −0.703879E−07 | 0.467696E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 9.

TABLE 9

| Surface No. | Wide angle position | Middle position | Telephoto position |
|---|---|---|---|
| $d_4$ | 16.300 | 6.010 | 2.452 |
| $d_{10}$ | 5.222 | 11.777 | 18.338 |
| $d_{12}$ | 2.691 | 2.691 | 2.691 |

Figure 6A:
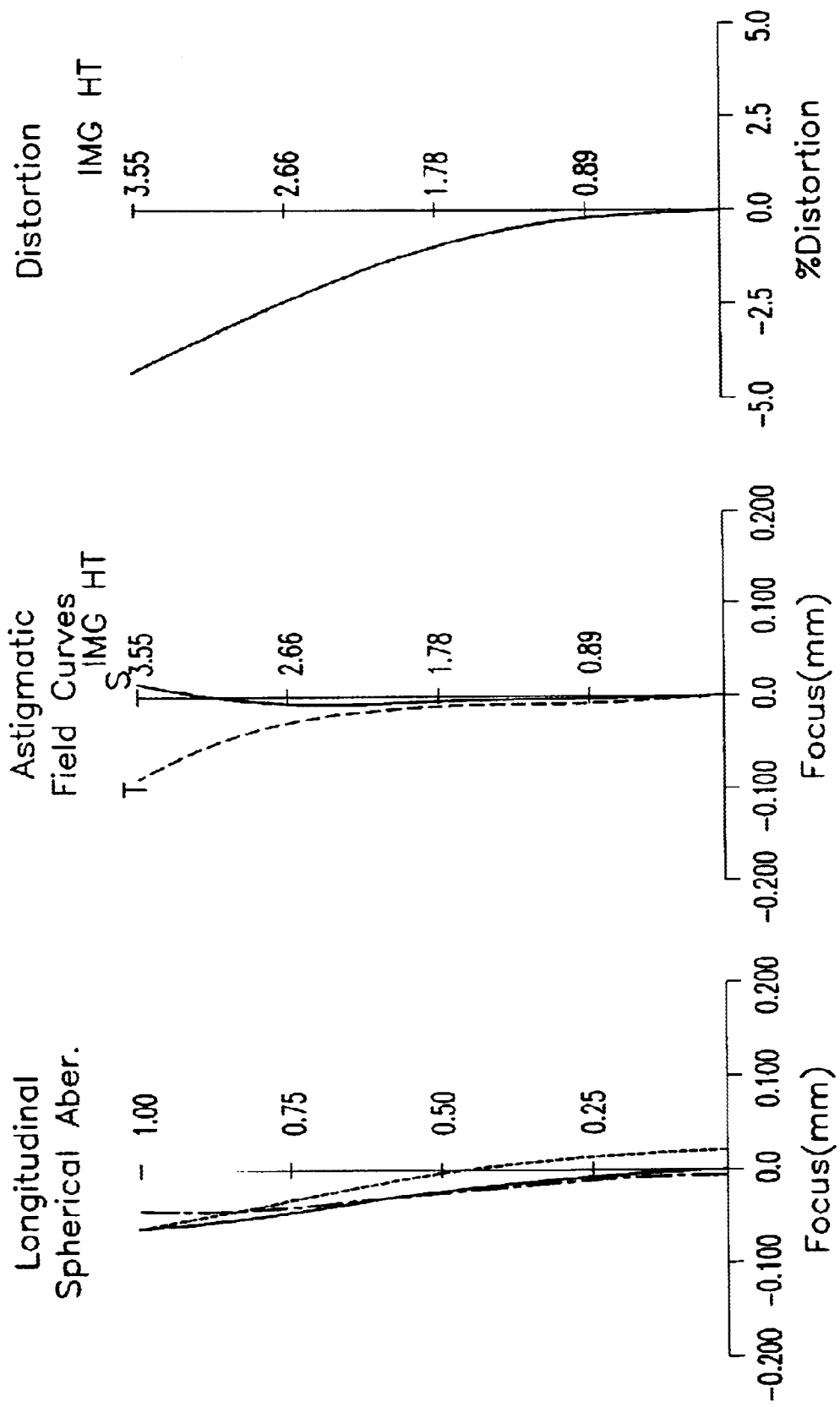
FIGS. 6a and 6b show aberration curves of the compact zoom lens system at a wide-angle position and at a telephoto position respectively.
Figure 6B:
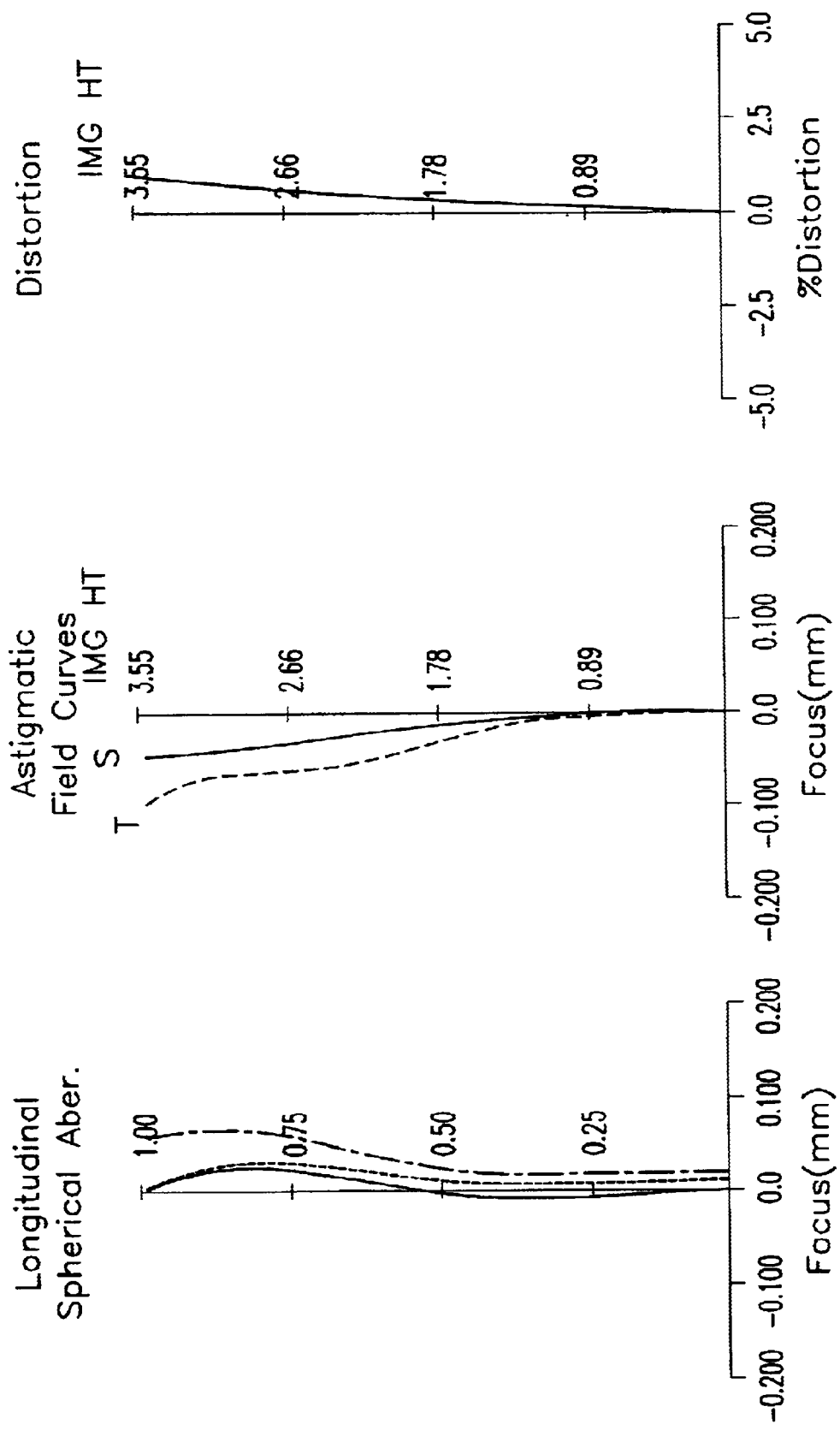

FIGS. 6a and 6b illustrate superior aberration characteristics of the third embodiment at a wide-angle position and at a telephoto position respectively.

In the fourth embodiment, number F ranges from 2.80 to 4.84, the focal length ranges from 5.91 mm to 17.06 mm, and the viewing angle ranges from 60.59° to 21.88°. In the middle position, number F is 3.85, the focal length is 11.75 mm, and the viewing angle is 31.49° respectively.

Figure 7:
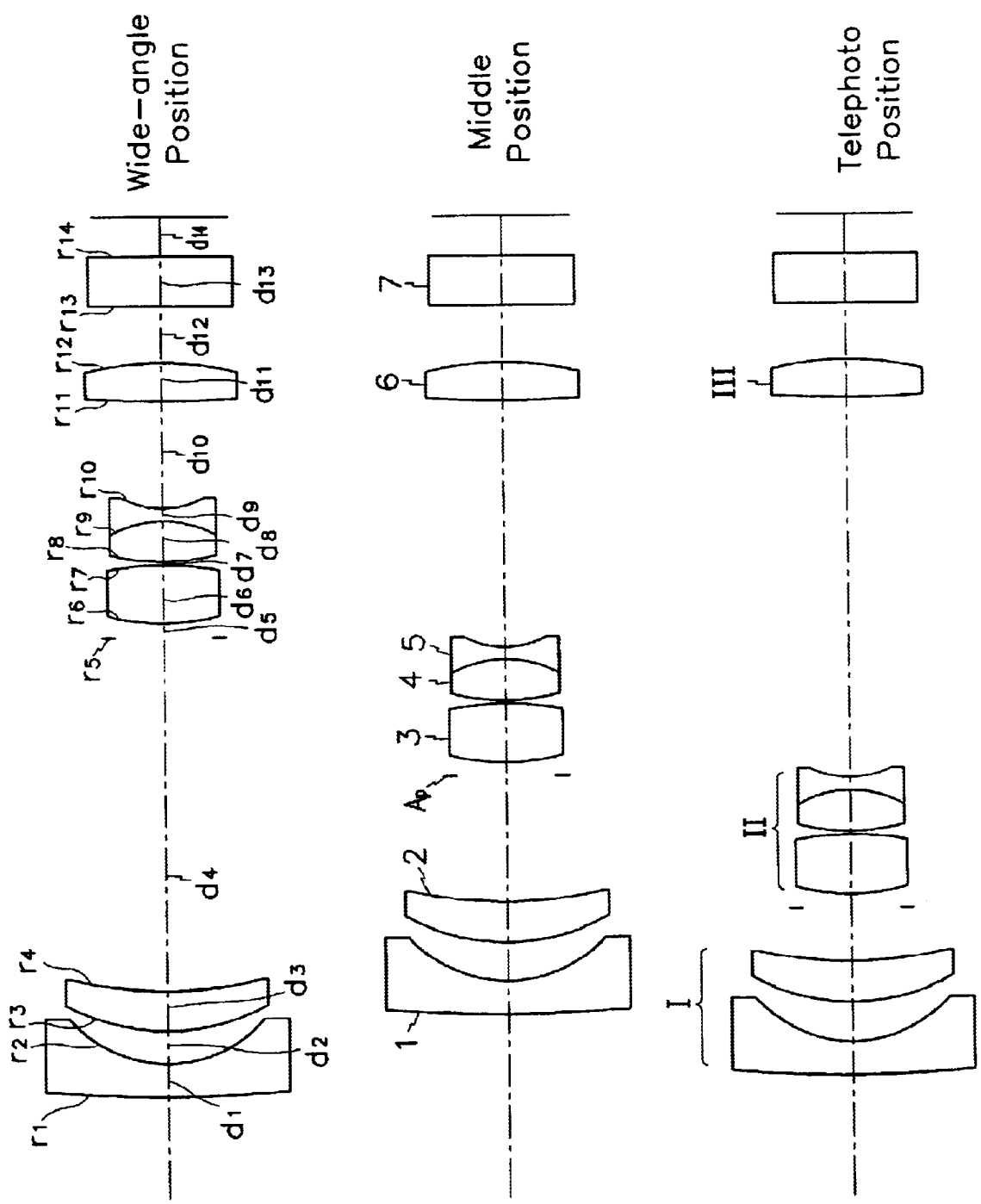
FIG. 7 is a side view of a compact zoom lens system at respective zoom positions.

FIG. 7 illustrates the structure of the zoom lens system according to the fourth embodiment. As shown in FIG. 7, the zoom lens system is constructed in the same manner as the zoom lens system of the first embodiment. Data for the fourth embodiment is listed in Table 10.

TABLE 10

| Surface No. | Radius of Curvature (r) | Distance (d) (mm) | Refractive index (nd) | Abbe Number (v) |
|---|---|---|---|---|
| 1 | 81.97600 | 1.30000 | 1.80600 | 40.70 |
| *2 | 5.26000 | 1.530000 | | |
| 3 | 8.49300 | 2.08000 | 1.84700 | 23.80 |
| 4 | 22.75600 | $d_4$ | | |
| 5 | ∞ | 0.65000 | | |
| *6 | 8.23200 | 2.630000 | 1.51500 | 63.10 |
| *7 | −12.40800 | 0.140000 | | |
| 8 | 12.68000 | 1.910000 | 1.80400 | 46.50 |
| 9 | −5.54300 | 0.600000 | 1.64800 | 33.80 |
| 10 | 4.56000 | $d_{10}$ | | |
| 11 | 50.10000 | 1.770000 | 1.51500 | 63.10 |
| *12 | −14.25300 | $d_{12}$ | | |
| 13 | ∞ | 2.350000 | 1.51700 | 64.20 |
| 14 | ∞ | 1.700001 | | |

In the fourth embodiment, the surface facing the image plane of first lens 1 of the first lens group I, the surfaces facing the image plane and the object of third lens 3 of the second lens group II, and the surface facing the image plane of sixth lens 6 of the third lens group III are aspherical surfaces, as in the first embodiment. The coefficients of the aspherical surfaces according to the fourth embodiment are shown in the following Table 11.

TABLE 11

| | Aspherical coefficients of the second surface | | Aspherical coefficients of the sixth surface |
|---|---|---|---|
| K | −0.559111 | K | −3.569515 |
| A | −0.166786E−04 | A | −0.240665E−03 |
| B | −0.351578E−06 | B | −0.360723E−04 |
| C | −0.318581E−07 | C | −0.131973E−05 |
| D | −0.783358E−09 | D | 0.328949E−07 |

| | Aspherical coefficients of the seventh surface | | Aspherical coefficients of the twelfth surface |
|---|---|---|---|
| K | 0.617655 | K | −23.070513 |
| A | −0.391816E | A | −0.767529E−03 |
| B | −0.118013E−04 | B | 0.283532E−04 |
| C | −0.17914E−05 | C | −0.500196E−06 |
| D | 0.110012E−06 | D | −0.280553E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 12.

TABLE 12

| Surface No. | Wide angle position | Middle position | Telephoto position |
|---|---|---|---|
| $d_4$ | 16.610 | 5.800 | 2.500 |
| $d_{10}$ | 4.974 | 11.509 | 17.6734 |
| $d_{12}$ | 2.675 | 2.784 | 2.675 |

Figure 8A:
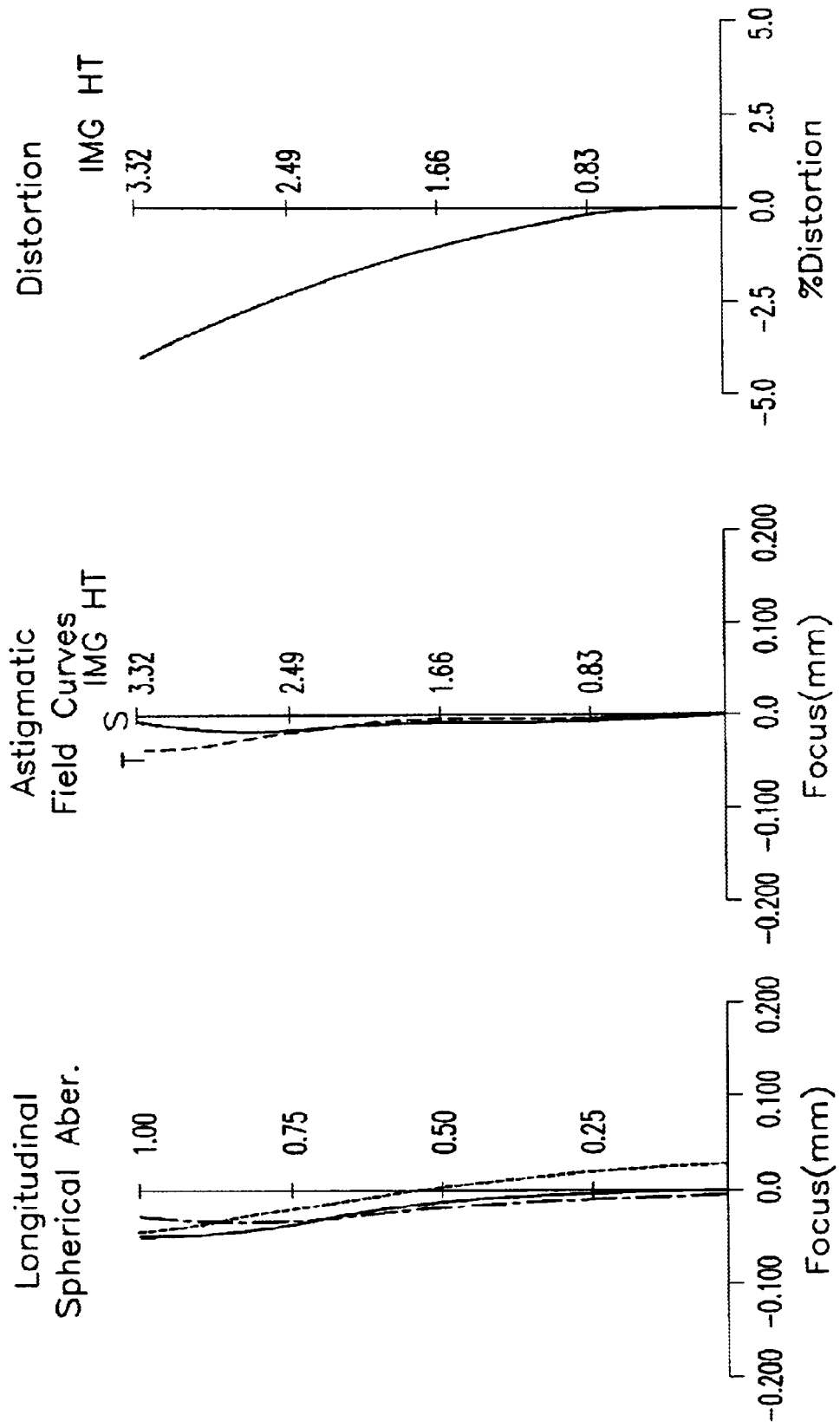

FIGS. 8a and 8b illustrate superior aberration characteristics of the fourth embodiment at a wide-angle position and at a telephoto position respectively.

In the fifth embodiment, number F ranges from 2.87 to 5.01, the focal length ranges from 5.91 mm to 17.08 mm, and the viewing angle ranges from 60.57° to 21.88°. In the middle position, number F is 3.94, the focal length is 11.50 mm, and the viewing angle is 32.19°.

Figure 9:
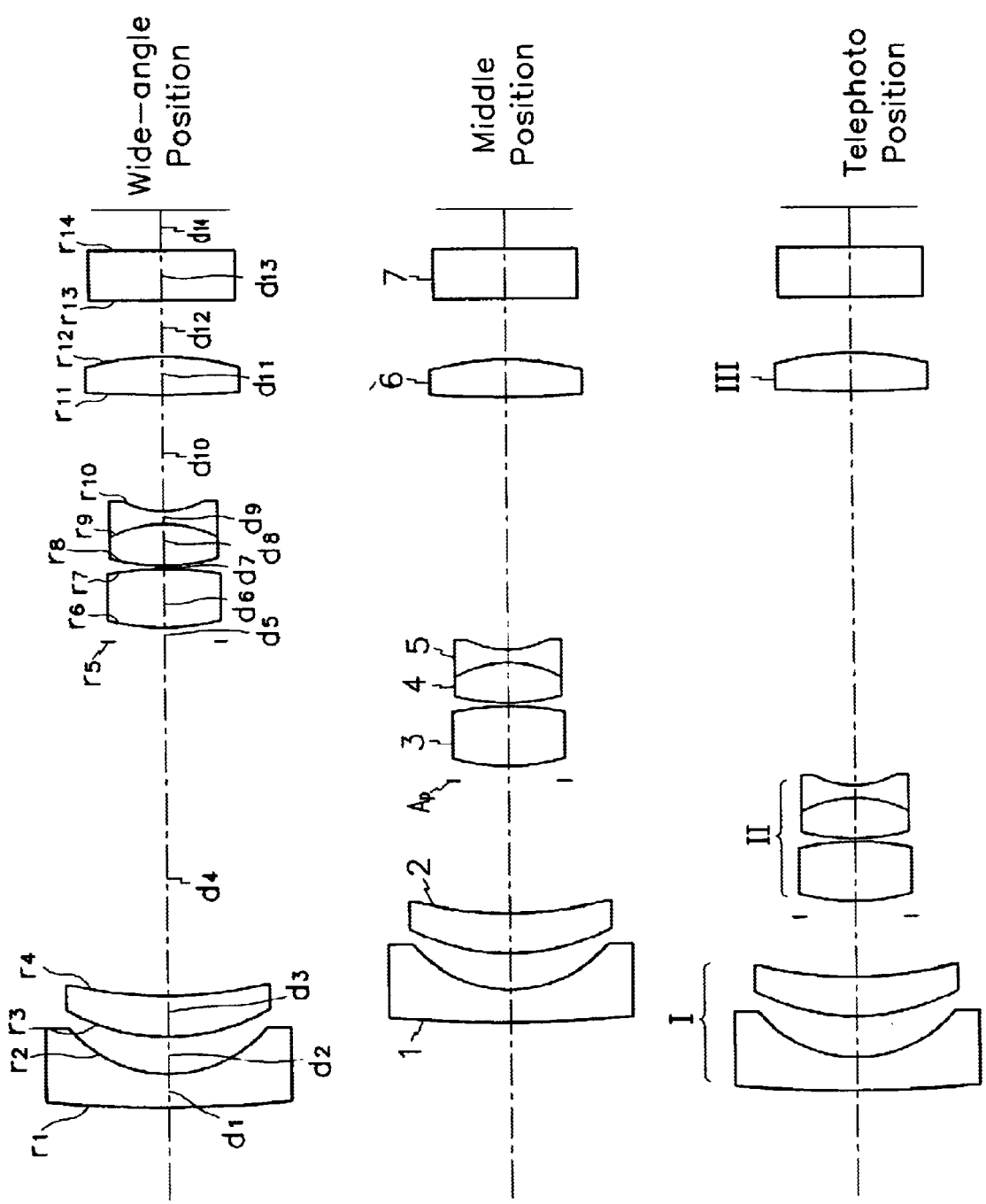
FIG. 9 is a side view of a compact zoom lens system at respective zoom positions.

FIG. 9 illustrates the structure of the zoom lens system according to the fifth embodiment. As shown in FIG. 9, the zoom lens system according to the fifth embodiment is constructed in the same manner as the zoom lens system of the first embodiment. Data for the fifth embodiment is listed in Table 13.

TABLE 13

| Surface No. | Radius of Curvature (r) | Distance (d) (mm) | Refractive Index (nd) | Abbe Number (v) |
|---|---|---|---|---|
| 1 | 198.34000 | 1.300000 | 1.80600 | 40.70 |
| *2 | 5.23300 | 1.650000 | | |
| 3 | 9.18900 | 2.030000 | 1.84700 | 23.80 |
| 4 | 30.91100 | $d_4$ | | |
| 5 | ∞ | 0.650000 | | |
| *6 | 8.25300 | 2.720000 | 1.51500 | 63.10 |
| 7 | −14.20600 | 0.100000 | | |
| 8 | 11.54100 | 1.970000 | 1.80400 | 46.50 |
| 9 | −5.29200 | 0.600000 | 1.64800 | 33.80 |
| 10 | 4.43900 | $d_{10}$ | | |
| 11 | 38.79700 | 1.730000 | 1.51500 | 63.10 |
| *12 | −16.61800 | $d_{12}$ | | |
| 13 | ∞ | 2.350000 | 1.51700 | 64.20 |
| 14 | ∞ | 1.700881 | | |

In the fifth embodiment, the surface facing the image plane of first lens 1 of the first lens group I, the surface facing the object of third lens 3 of the second lens group II, and the surface facing the image plane of sixth lens 6 of the third lens group III are aspherical surfaces, as in the third embodiment. The coefficients of the aspherical surfaces according to the fifth embodiment are shown in the following Table 14.

TABLE 14

| | Aspherical coefficients of the second surface | Aspherical coefficients of the sixth surface | Aspherical coefficients of the twelfth surface |
|---|---|---|---|
| K | −0.649217 | −3.118592 | −30.793494 |
| A | −0.399494E−04 | −0.221615E−03 | −0.643456E−03 |
| B | 0.372675E−06 | −0.303817E−04 | 0.228798E−04 |
| C | −0.639370E−07 | 0.136226E−05 | −0.368614E−06 |
| D | −0.165169E−09 | −0.123324E−06 | −0.260155E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 15.

TABLE 15

| Surface No. | Wide-angle position | Middle position | Telephoto position |
|---|---|---|---|
| $d_4$ | 16.306 | 6.004 | 2.450 |
| $d_{10}$ | 5.217 | 11.756 | 18.275 |
| $d_{12}$ | 2.683 | 2.683 | 2.683 |

Figure 10A:
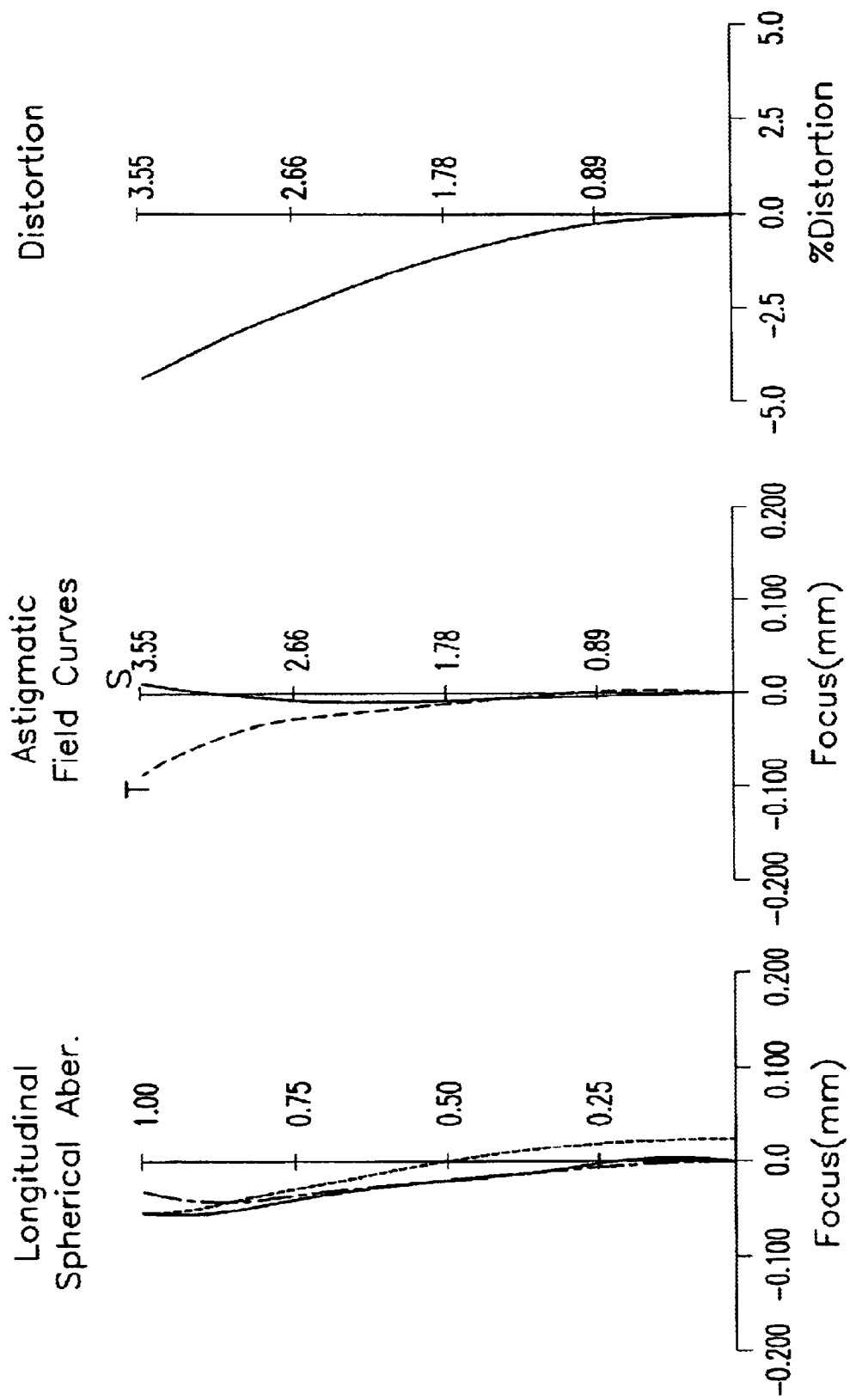
FIGS. 10a and 10b show aberration curves of the compact zoom lens system at a wide-angle position and at a telephoto position respectively.
Figure 10B:
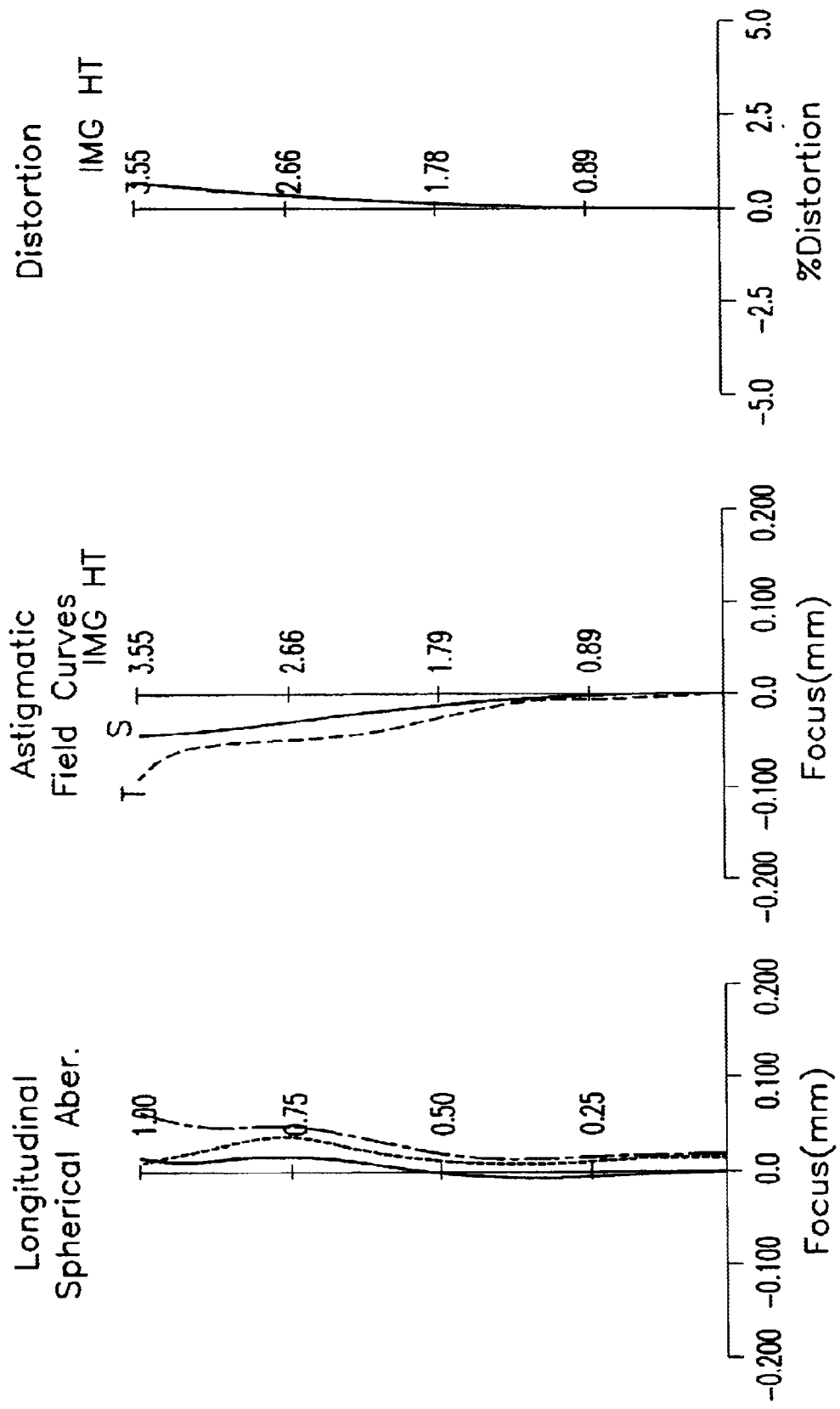

FIGS. 10a and 10b illustrate superior aberration characteristics of the fifth embodiment at a wide-angle position and at a telephoto position respectively.

In the sixth embodiment, number F ranges from 2.82 to 5.03, the focal length ranges from 8.17 mm to 23.59 mm, and the viewing angle ranges from 59.27° to 21.48°. In the middle position, number F is 3.87, the focal length is 15.73 mm, and the viewing angle is 31.97° respectively.

Figure 11:
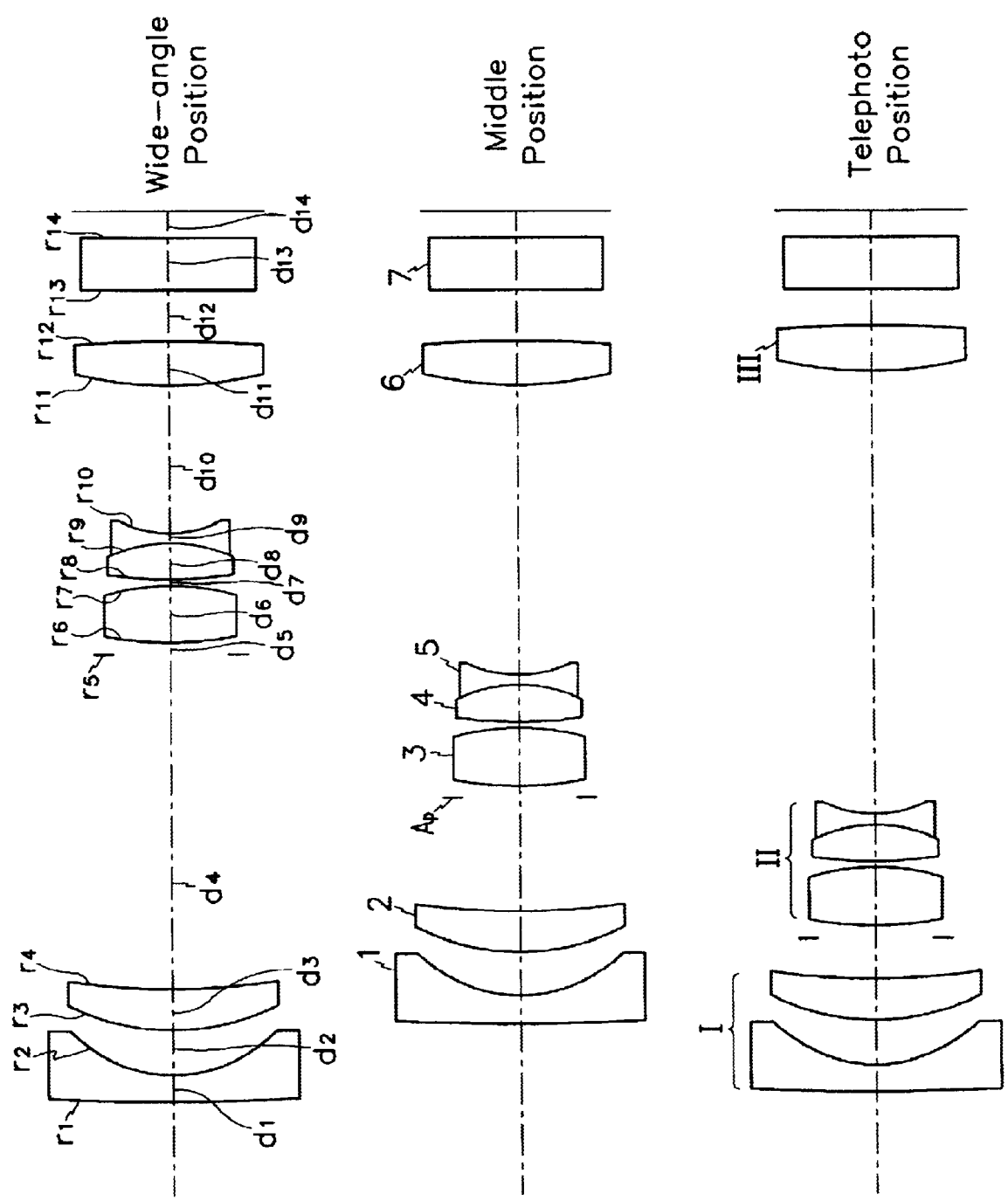
FIG. 11 is side view of a compact zoom lens system at respective zoom positions.

FIG. 11 illustrates the structure of the zoom lens system according to the sixth embodiment. As shown in FIG. 11, the zoom lens system according to the sixth embodiment is constructed in the same manner as the zoom lens system of the first embodiment. Data for the sixth embodiment is listed in Table 16.

TABLE 16

| Surface No. | Radius of Curvature (r) | Distance (d) (mm) | Refractive Index (nd) | Abbe Number (v) |
|---|---|---|---|---|
| 1 | 200.00000 | 1.500000 | 1.75110 | 45.40 |
| *2 | 6.68500 | 2.530000 | | |
| 3 | 12.19000 | 2.330000 | 1.80520 | 25.50 |
| 4 | 36.19000 | $d_4$ | | |
| 5 | ∞ | 0.620000 | | |
| *6 | 10.09200 | 3.400000 | 1.51450 | 63.10 |
| *7 | −13.01700 | 0.320000 | | |
| 8 | 16.59200 | 2.210000 | 1.83500 | 43.00 |
| 9 | −7.81100 | 0.600000 | 1.67270 | 32.20 |
| 10 | 5.55500 | $d_{10}$ | | |
| 11 | 21.14300 | 2.540000 | 1.51450 | 63.10 |
| *12 | −57.88500 | $d_{12}$ | | |
| 13 | ∞ | 3.000000 | 1.51680 | 64.20 |
| 14 | ∞ | 1.399995 | | |

In the sixth embodiment, the surface facing the image plane of first lens 1 of the first lens group I, the surfaces facing the image plane and the object of third lens 3 of the second lens group II, and the surface facing the image plane of sixth lens 6 of the third lens group III are aspherical surfaces, as in the first embodiment. The coefficients of the aspherical surfaces according to the sixth embodiment are shown in the following Table 17.

TABLE 17

| | Aspherical coefficients of the second surface | | Aspherical coefficients of the sixth surface |
|---|---|---|---|
| K | −0.608787 | K | −4.399275 |
| A | −0.387634E−04 | A | −0.148111E−03 |
| B | 0.417507E−06 | B | −0.166945E−04 |
| C | −0.234979E−07 | C | −06.30067E−06 |
| D | 0.886247E−10 | D | 0.356648E−09 |

| | Aspherical coefficients of the seventh surface | | Aspherical coefficients of the twelfth surface |
|---|---|---|---|
| K | 1.661785 | K | 29.763660 |
| A | −0.780982E−04 | A | 0.561824E−04 |
| B | −0.739383E−05 | B | −0.443075E−05 |
| C | −0.574547E−06 | C | 0.163025E−06 |
| D | 0.107518E−07 | D | −0.225716E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 18.

TABLE 18

| Surface No. | Wide-angle position | Middle position | Telephoto position |
|---|---|---|---|
| $d_4$ | 19.458 | 6.717 | 2.450 |
| $d_{10}$ | 8.465 | 16.752 | 25.854 |
| $d_{12}$ | 2.915 | 2.870 | 2.004 |

Figure 12A:
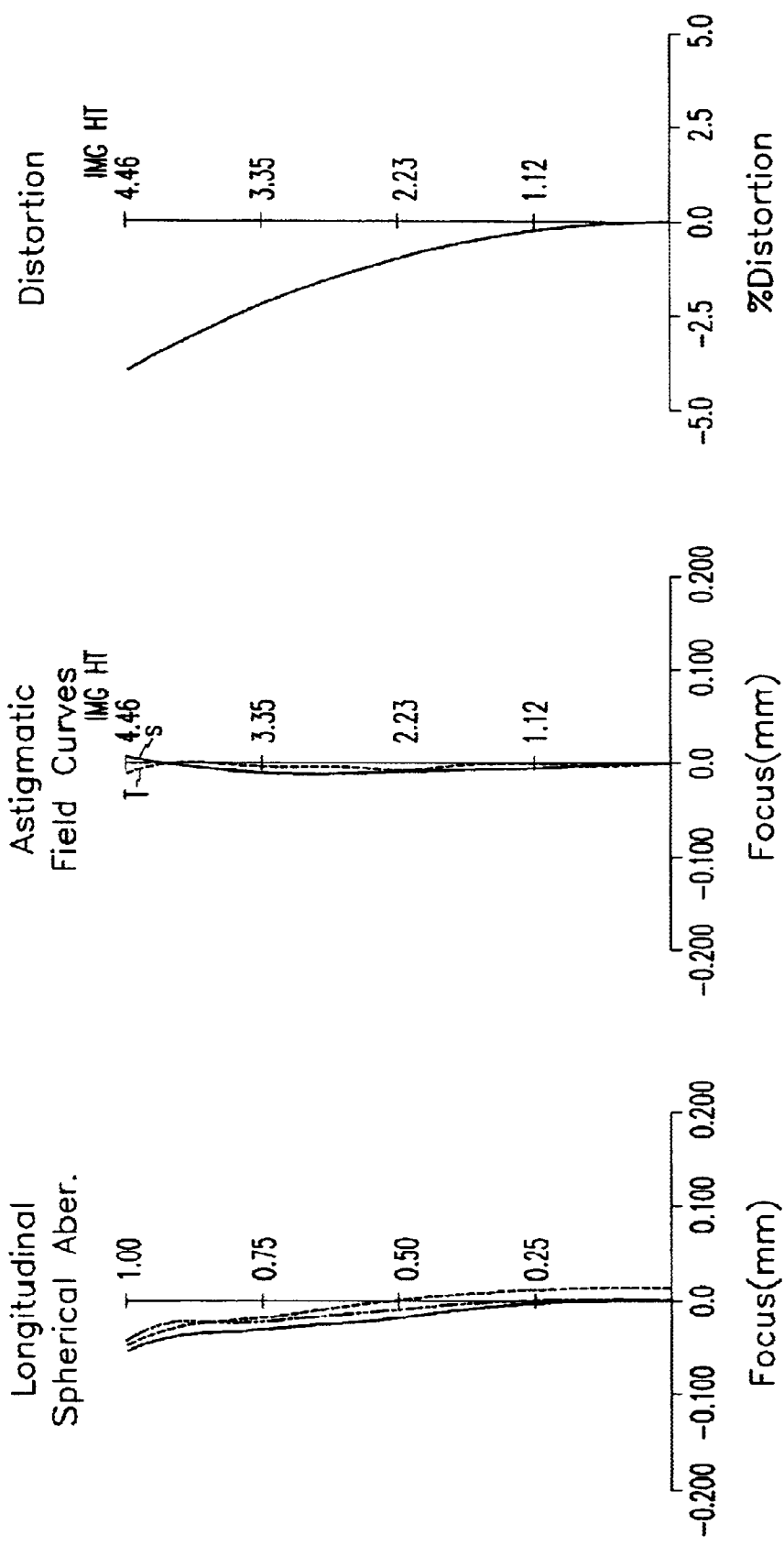

FIGS. 12a and 12b illustrate superior aberration characteristics of the sixth embodiment at a wide-angle position and at a telephoto position respectively.

In the seventh embodiment, number F ranges from 2.81 to 4.98, the focal length ranges from 8.21 mm to 23.63 mm, and the viewing angle ranges from 59.02° to 21.42°. In the middle position, number F is 3.88, the focal length is 15.76 mm, and the viewing angle is 31.84°.

Figure 13:
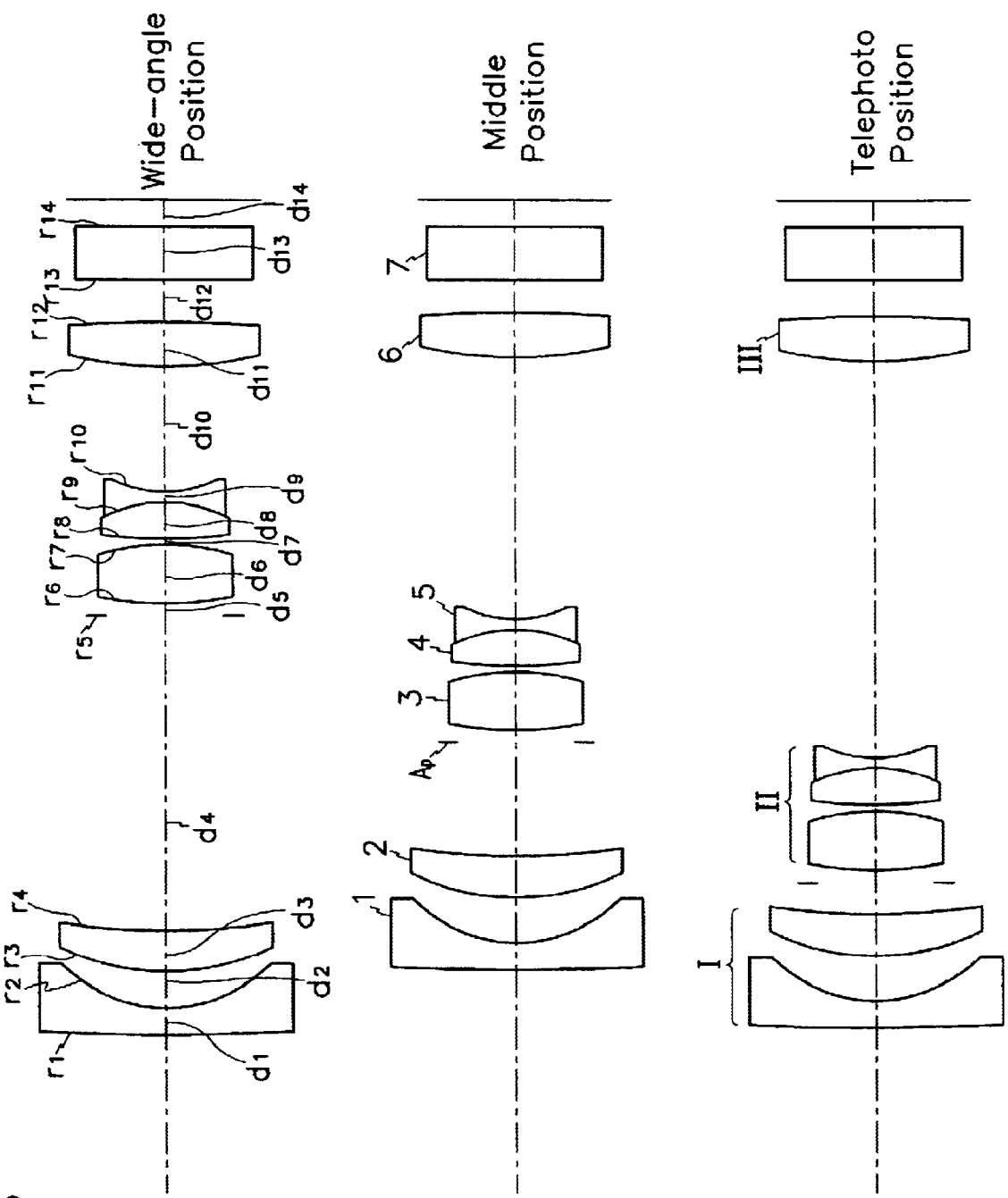
FIG. 13 is side view of a compact zoom lens system at respective zoom positions.

FIG. 13 illustrates the structure of the zoom lens system according to the seventh embodiment. As shown in FIG. 13, the zoom lens system according to the seventh embodiment is constructed in the same manner as the zoom lens system of the first embodiment. Data for the fifth embodiment is listed in Table 19.

TABLE 19

| Surface No. | Radius of Curvature (r) | Distance (d) (mm) | Refractive Index (nd) | Abbe Number (v) |
|---|---|---|---|---|
| 1 | 199.20000 | 1.500000 | 1.80430 | 40.90 |
| *2 | 7.01500 | 2.370000 | | |
| 3 | 12.76000 | 2.350000 | 1.84700 | 23.80 |
| 4 | 45.13200 | $d_4$ | | |
| 5 | ∞ | 0.600000 | | |
| *6 | 10.45500 | 3.400000 | 1.51450 | 63.10 |
| 7 | −19.21000 | 0.440000 | | |
| 8 | 13.50000 | 2.400000 | 1.83500 | 43.00 |
| 9 | −7.18000 | 0.60000 | 1.67270 | 32.20 |
| 10 | 5.53000 | $d_{10}$ | | |
| 11 | 20.04000 | 2.550000 | 1.51450 | 63.10 |
| *12 | −54.50000 | $d_{12}$ | | |
| 13 | ∞ | 3.00000 | 1.51680 | 64.20 |
| 14 | ∞ | 1.400000 | | |

In the seventh embodiment, the surface facing the image plane of first lens 1 of the first lens group I, the surface facing the object of third lens 3 of the second lens group II, and the surface facing the image plane of sixth lens 6 of the third lens group III are aspherical surfaces. The coefficients of the aspherical surfaces according to the seventh embodiment are shown in the following Table 20.

TABLE 20

| | Aspherical coefficients of the second surface | Aspherical coefficients of the sixth surface | Aspherical coefficients of the twelfth surface |
|---|---|---|---|
| K | −0.600402 | −3.536689 | 84.603002 |
| A | −0.419472E−04 | −0.334452E−04 | 0.973303E−04 |
| B | 0.269824E−06 | −0.555785E−05 | −0.170802E−05 |
| C | −0.216852E−07 | 0.143368E−06 | 0.514340E−07 |
| D | 0.136418E−09 | 0.231754E−08 | 0.132618E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 21.

TABLE 21

| Surface No. | Wide-angle position | Middle position | Telephoto position |
|---|---|---|---|
| $d_4$ | 20.081 | 7.262 | 2.460 |
| $d_{10}$ | 8.267 | 17.103 | 25.583 |
| $d_{12}$ | 2.941 | 2.310 | 2.003 |

Figure 14A:
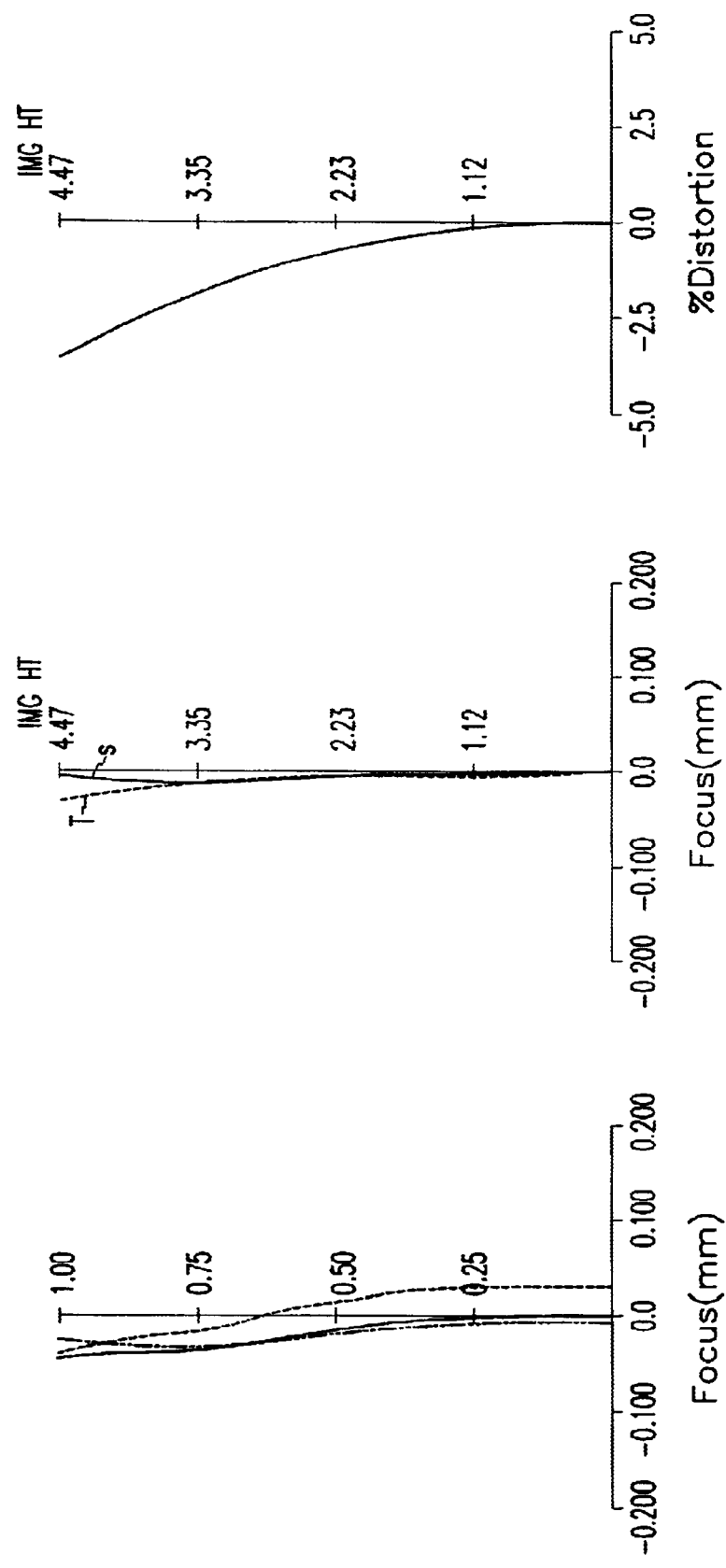
FIGS. 14a and 14b show aberration curves of the compact zoom lens system at a wide-angle position and at a telephoto position respectively.
Figure 14B:
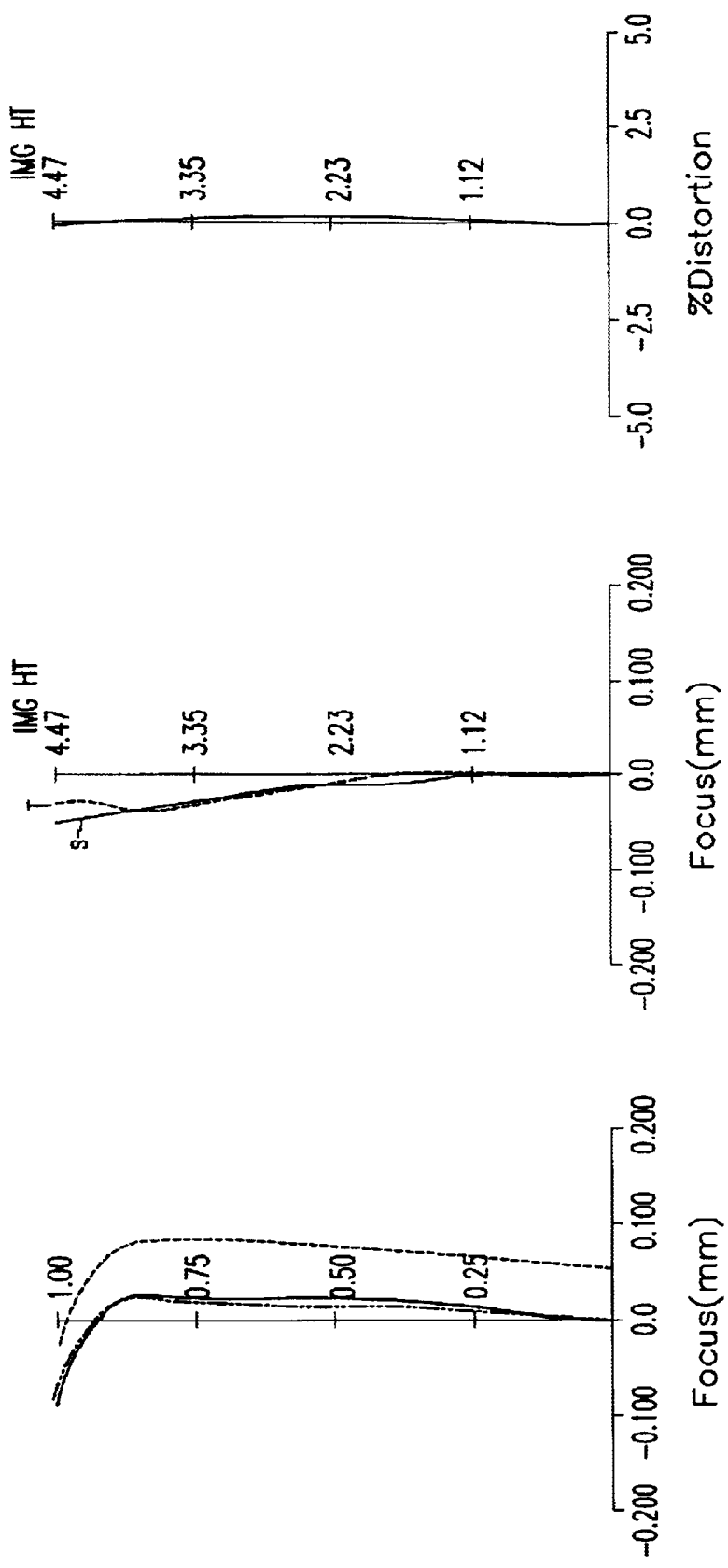

FIGS. 14a and 14b illustrate superior aberration characteristics of the seventh embodiment at a wide-angle position and at a telephoto position respectively.

In the eighth embodiment, number F ranges from 2.82 to 5.02, the focal length ranges from 8.21 mm to 23.63 mm, and the viewing angle ranges from 59.00° to 21.41°. In the middle position, number F is 3.91, the focal length is 15.78 mm, and the viewing angle is 31.77° respectively.

Figure 15:
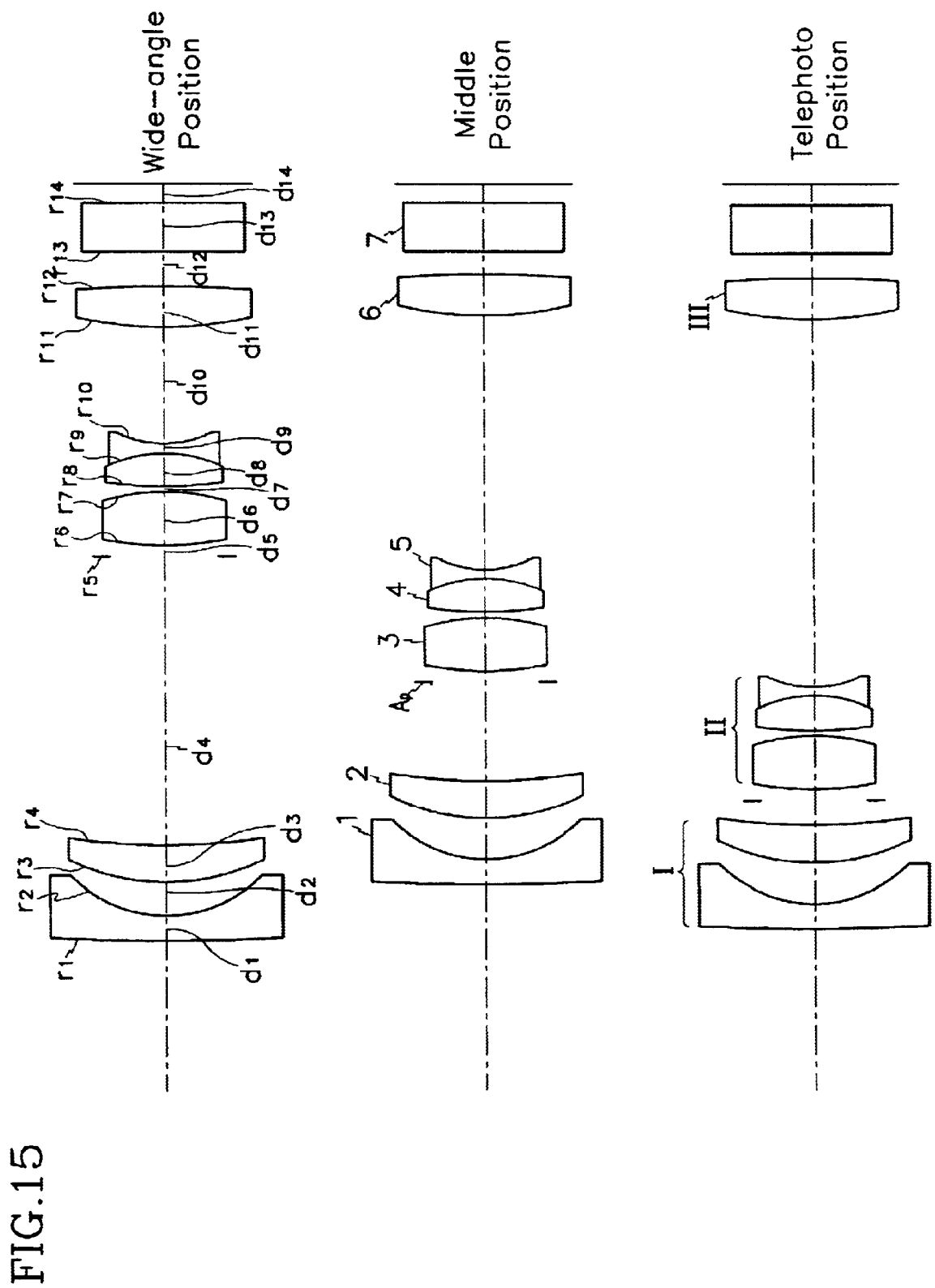
FIG. 15 is side view of a compact zoom lens system at respective zoom positions.

FIG. 15 illustrates the structure of the zoom lens system according to the eighth embodiment. As shown in FIG. 15, the zoom lens system according to the eighth embodiment is constructed in the same manner as the zoom lens system of the first embodiment. Data for the eighth embodiment is listed in Table 22.

TABLE 22

| Surface No. | Radius of Curvature (r) | Distance (d) (mm) | Refractive Index (nd) | Abbe Number (v) |
|---|---|---|---|---|
| 1 | 250.00000 | 1.500000 | 1.80430 | 40.90 |
| *2 | 6.94800 | 2.330000 | | |
| 3 | 12.64700 | 2.490000 | 1.84700 | 23.80 |
| 4 | 46.07000 | $d_4$ | | |
| 5 | ∞ | 0.600000 | | |
| *6 | 10.21000 | 3.500000 | 1.51450 | 63.10 |
| 7 | −18.91800 | 0.290000 | | |
| 8 | 13.73000 | 2.370000 | 1.83500 | 43.00 |
| 9 | −7.10200 | 0.600000 | 1.57270 | 32.20 |
| 10 | 5.52100 | $d_{10}$ | | |
| 11 | 22.16300 | 2.550000 | 1.51680 | 64.20 |
| 12 | −40.60000 | $d_{12}$ | | |
| 13 | ∞ | 3.000000 | 1.51680 | 64.20 |
| 14 | ∞ | 1.400000 | | |

In the eighth embodiment, the surface facing the image plane of first lens 1 of the first lens group I, and the surface facing the object of third lens 3 of the second lens group II are aspherical surfaces. The coefficients of the aspherical surfaces according to the eighth embodiment are shown in the following Table 23.

TABLE 23

| | Aspherical coefficients of the second surface | Aspherical coefficients of the sixth surface |
|---|---|---|
| K | −0.708475 | −3.585380 |
| A | −0.304314E−05 | −0.252737E−04 |
| B | 0.465971E−06 | −0.545103E−05 |
| C | −0.229706E−07 | −0.215667E−06 |
| D | 0.209566E−09 | 0.432513E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 24.

TABLE 24

| Surface No. | Wide-angle position | Middle position | Telephoto position |
|---|---|---|---|
| $d_4$ | 19.930 | 7.276 | 2.497 |
| $d_{10}$ | 8.754 | 17.626 | 26.029 |
| $d_{12}$ | 2.719 | 2.045 | 1.811 |

Figure 16A:
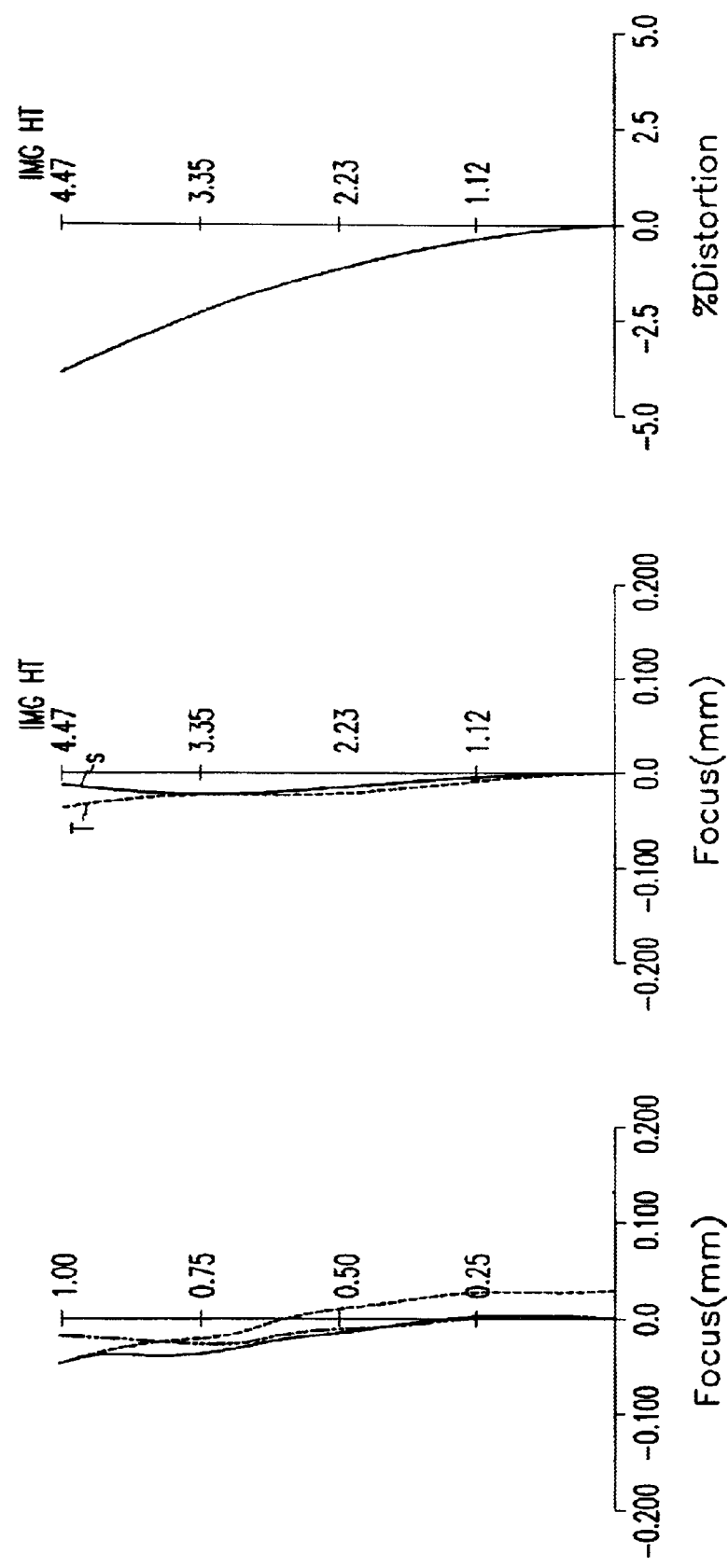
FIGS. 16a and 16b show aberration curves of the compact zoom lens system at a wide-angle position and at a telephoto position respectively.
Figure 16B:
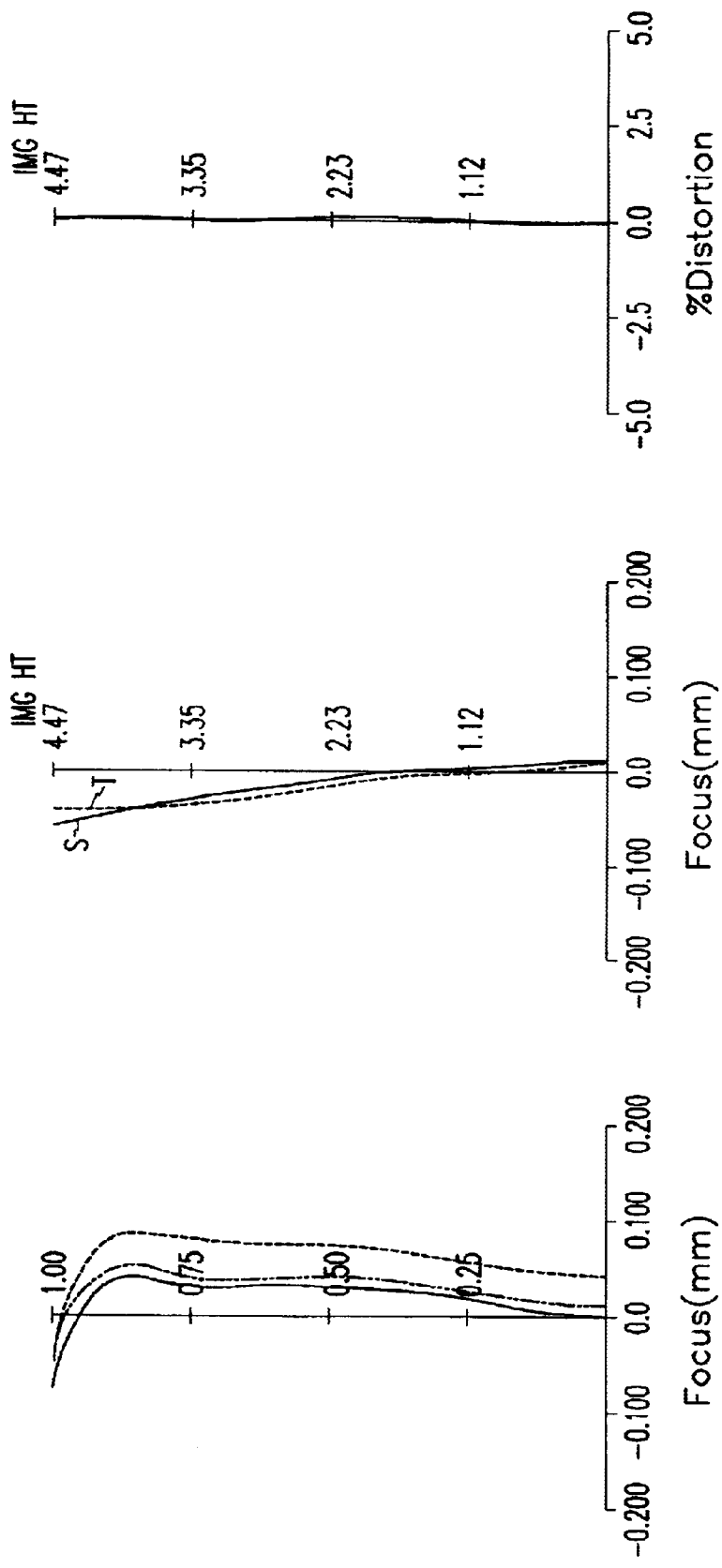

FIGS. 16a and 16b illustrate superior aberration characteristics of the eighth embodiment at a wide-angle position and at a telephoto position respectively.

In the ninth embodiment, number F ranges from 2.80 to 5.01, the focal length ranges from 7.95 mm to 22.72 mm, and the viewing angle ranges from 60.60° to 22.24°. In the middle position, number F is 3.93, the focal length is 15.15 mm, and the viewing angle is 33.00° respectively.

Figure 17:
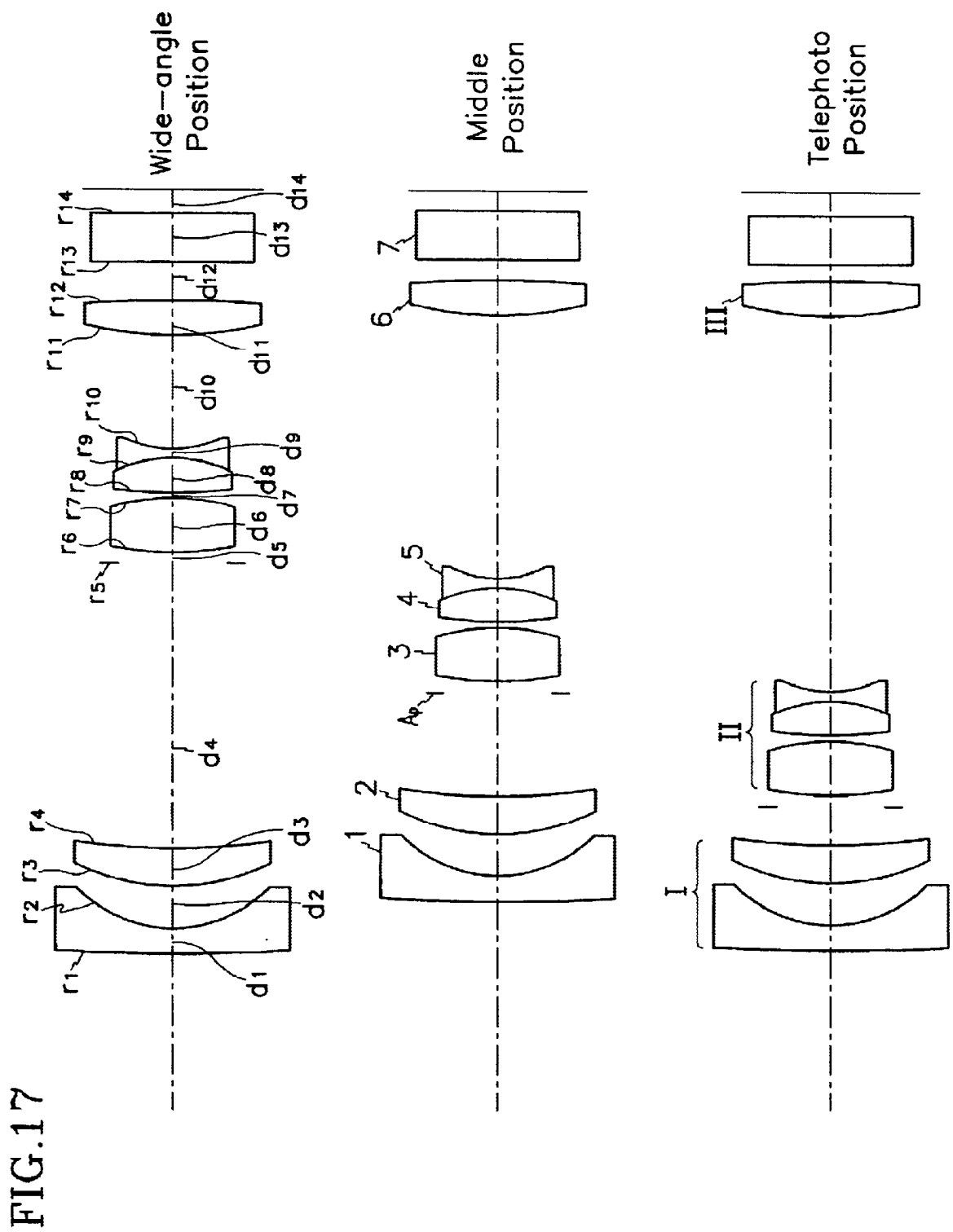
FIG. 17 is side view of a compact zoom lens system at respective zoom positions.

FIG. 17 illustrates the structure of the zoom lens system according to the ninth embodiment. As shown in FIG. 17, the zoom lens system according to the ninth embodiment is constructed in the same manner as the zoom lens system of the first embodiment. Data for the ninth embodiment is listed in Table 25.

TABLE 25

| Surface No. | Radius of Curvature (r) | Distance (d) (mm) | Refractive Index (nd) | Abbe Number (v) |
|---|---|---|---|---|
| 1 | 250.00000 | 1.500000 | 1.80430 | 45.90 |
| *2 | 6.76200 | 2.330000 | | |
| 3 | 12.52400 | 2.330000 | 1.8470 | 23.80 |
| 4 | 46.97400 | $d_4$ | | |
| 5 | ∞ | 0.600000 | | |
| *6 | 10.12000 | 3.500000 | 1.51450 | 63.10 |
| 7 | −18.16200 | 0.360000 | | |
| 8 | 13.99200 | 2.340000 | 1.83500 | 43.00 |
| 9 | −7.02000 | 0.600000 | 1.67270 | 32.20 |
| 10 | 5.50000 | $d_{10}$ | | |
| 11 | 20.56900 | 2.160000 | 1.51680 | 64.20 |
| 12 | −40.27200 | $d_{12}$ | | |
| 13 | ∞ | 3.000000 | 1.51680 | 64.20 |
| 14 | ∞ | 1.400000 | | |

In the ninth embodiment, the surface facing the image plane of first lens 1 of the first lens group I, and the surface facing the object of third lens 3 of the second lens group II are aspherical surfaces. The coefficients of the aspherical surface according to the ninth embodiment are shown in the following Table 26.

TABLE 26

| | Aspherical coefficients of the second surface | | Aspherical coefficients of the sixth surface |
|---|---|---|---|
| K | −0.795625 | K | −3.602351 |
| A | 0.245386E−04 | A | −0.313322E−04 |
| B | 0.608104E−06 | B | −0.486705E−05 |
| C | −0.237189E−07 | C | −0.304382E−06 |
| D | 0.229752E−09 | D | 0.753285E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 27.

TABLE 27

| Surface No. | Wide-angle position | Middle position | Telephoto position |
|---|---|---|---|
| $d_4$ | 19.618 | 7.869 | 2.948 |
| $d_{10}$ | 8.415 | 17.781 | 25.946 |
| $d_{12}$ | 3.020 | 1.827 | 1.804 |

Figure 18A:
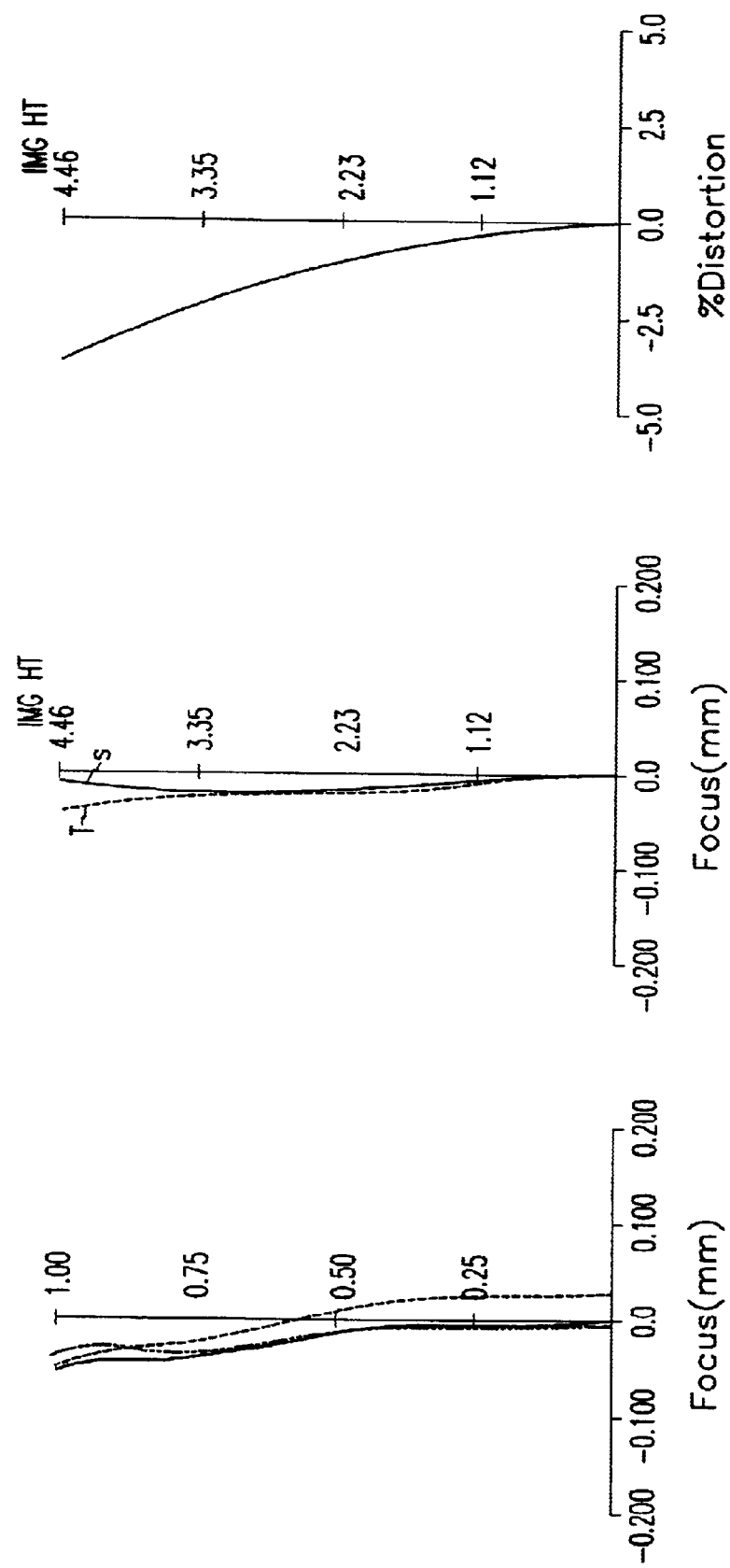
FIGS. 18a and 18b show aberration curves of the compact zoom lens system at a wide-angle position and at a telephoto position respectively.
Figure 18B:
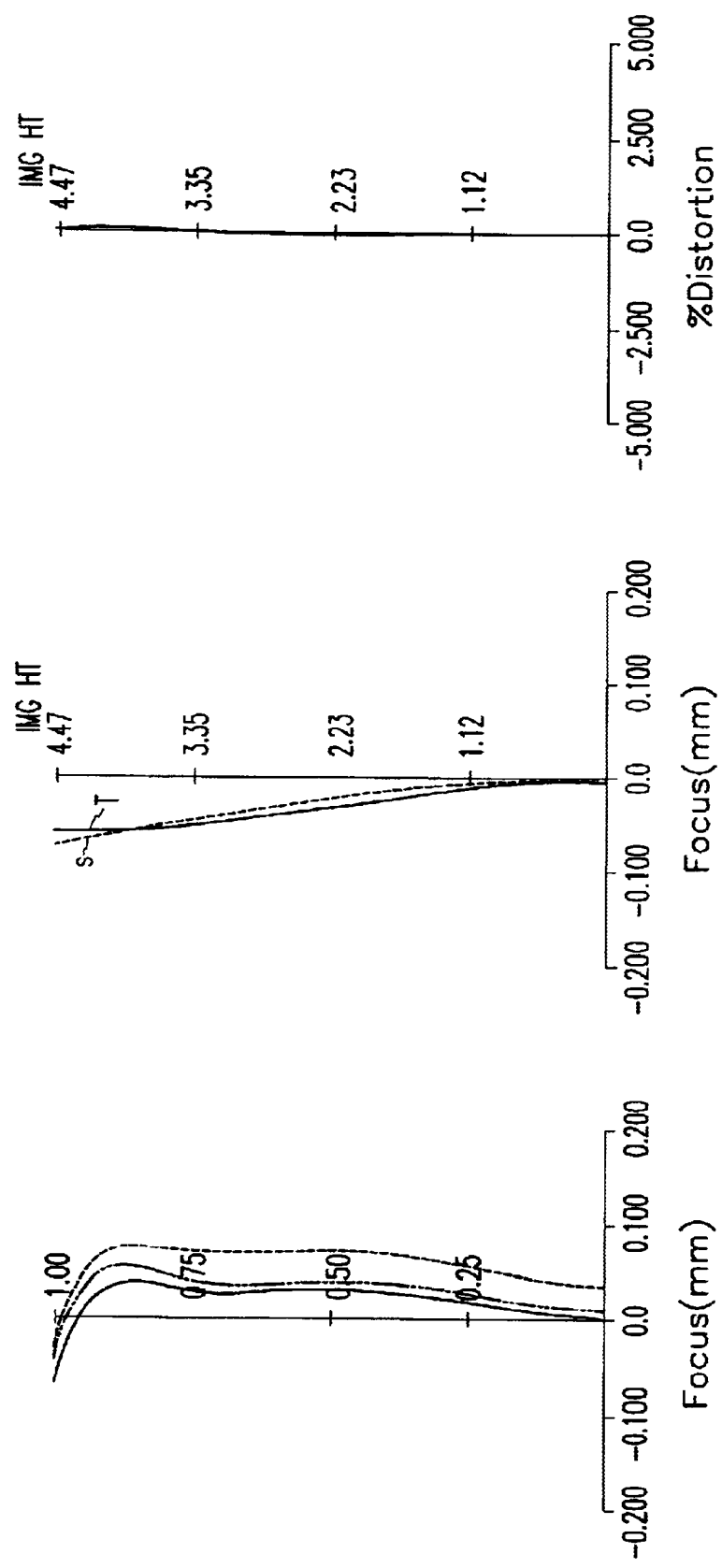

FIGS. 18a and 18b illustrate superior aberration characteristics of the ninth embodiment at a wide-angle position and at a telephoto position respectively.

In the tenth embodiment, number F ranges from 2.83 to 5.11, the focal length ranges from 7.81 mm to 22.33 mm, and the viewing angle ranges from 61.48° to 22.68°. In the middle position, number F is 3.90, the focal length is 14.79 mm, and the viewing angle is 33.95° respectively.

Figure 19:
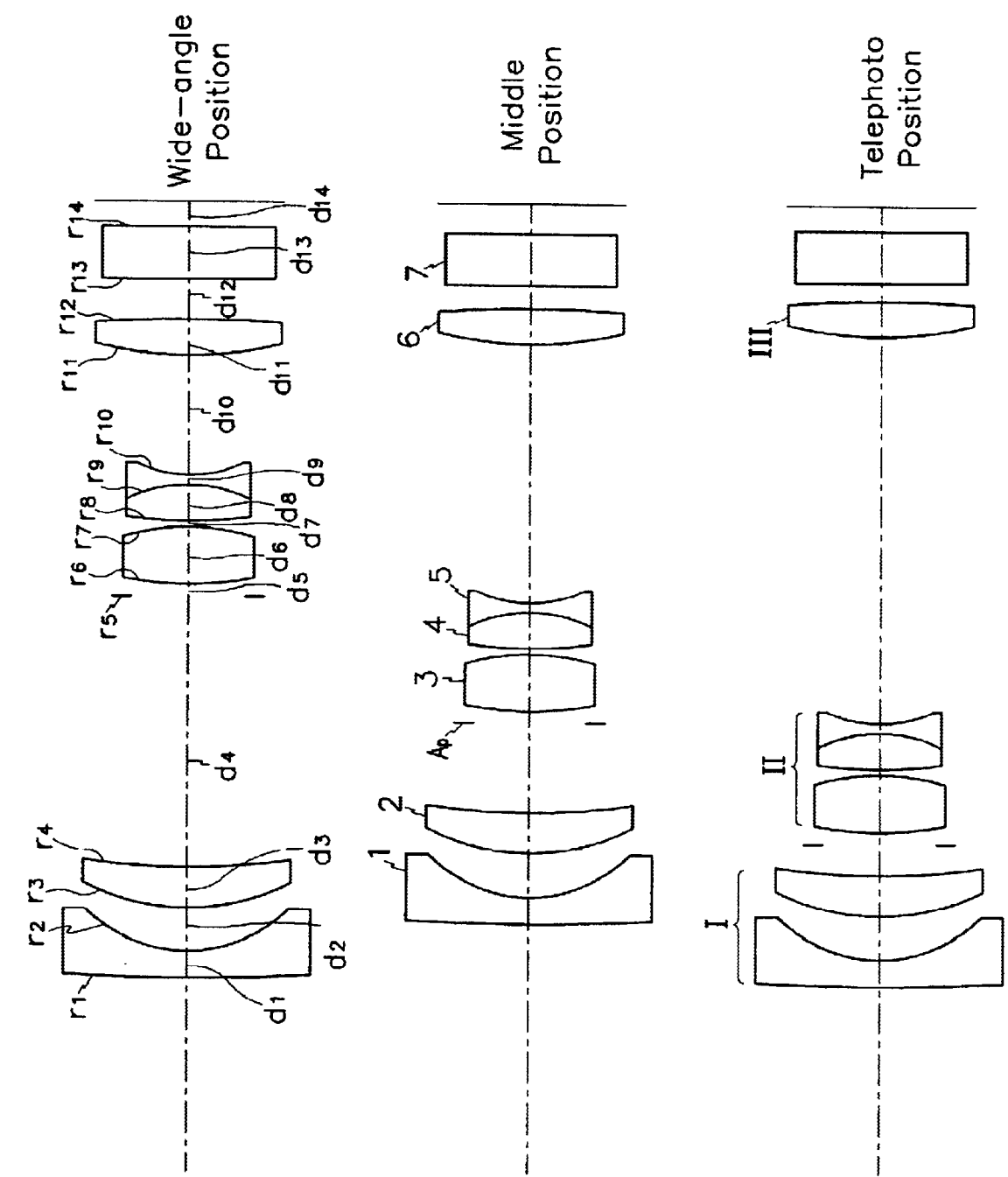
FIG. 19 is side view of a compact zoom lens system at respective zoom positions.

FIG. 19 illustrates the structure of the zoom lens system according to the tenth embodiment. As shown in FIG. 19, the zoom lens system according to the tenth embodiment is constructed in the same manner as the zoom lens system of the first embodiment. Data for the tenth embodiment is listed in Table 28.

TABLE 28

| Surface No. | Radius of Curvature (r) | Distance (d) (mm) | Refractive Index (nd) | Abbe Number (v) |
|---|---|---|---|---|
| 1 | 117.00000 | 1.350000 | 1.80430 | 40.90 |
| *2 | 6.43000 | 2.380000 | | |
| 3 | 11.90000 | 2.190000 | 1.84700 | 23.80 |
| 4 | 38.65000 | $d_4$ | | |
| 5 | ∞ | 1.000000 | | |
| *6 | 9.31500 | 3.100000 | 1.51450 | 63.10 |
| 7 | −17.27000 | 0.640000 | | |
| 8 | 13.76700 | 2.150000 | 1.83500 | 43.00 |
| 9 | −6.84300 | 0.600000 | 1.67270 | 32.20 |
| 10 | 5.21200 | $d_{10}$ | | |
| 11 | 16.38900 | 2.120000 | 1.51450 | 63.10 |
| *12 | −56.42800 | $d_{12}$ | | |

TABLE 28-continued

| Surface No. | Radius of Curvature (r) | Distance (d) (mm) | Refractive Index (nd) | Abbe Number (v) |
|---|---|---|---|---|
| 13 | ∞ | 3.000000 | 1.51680 | 64.20 |
| 14 | ∞ | 1.400000 | | |

In the tenth embodiment, the surface facing the image plane of first lens 1 of the first lens group I, the surface facing the object of third lens 3 of the second lens group II, and the surface facing the image plane of sixth lens 6 of the third lens group III are aspherical surfaces. The coefficients of the aspherical surfaces according to the tenth embodiment are shown in the following Table 29.

TABLE 29

| | Aspherical coefficients of the second surface | Aspherical coefficients of the sixth surface | Aspherical coefficients of the twelfth surface |
|---|---|---|---|
| K | −0.693073 | −3.423521 | −371.401149 |
| A | −0.196889E−04 | −0.506532E−05 | −0.213806E−03 |
| B | 0.212599E−05 | −0.798962E−05 | 0.503883E−05 |
| C | −0.892076E−07 | −0.131727E−06 | −0.112616E−06 |
| D | 0.104081E−08 | 0.153389E−08 | 0.125043E−08 |

The distance between second lens 2 and aperture Ap ($d_4$), the distance between fifth lens 5 and sixth lens 6 ($d_{10}$), and the distance between sixth lens 6 and optical filter 7 ($d_{12}$) are varied when zooming, and the amounts of variation of the distances are listed in the following Table 30.

TABLE 30

| Surface No. | Wide-angle position | Middle position | Telephoto position |
|---|---|---|---|
| $d_4$ | 17.525 | 6.166 | 2.127 |
| $d_{10}$ | 8.080 | 16.365 | 25.262 |
| $d_{12}$ | 2.558 | 2.257 | 1.405 |

Figure 20A:
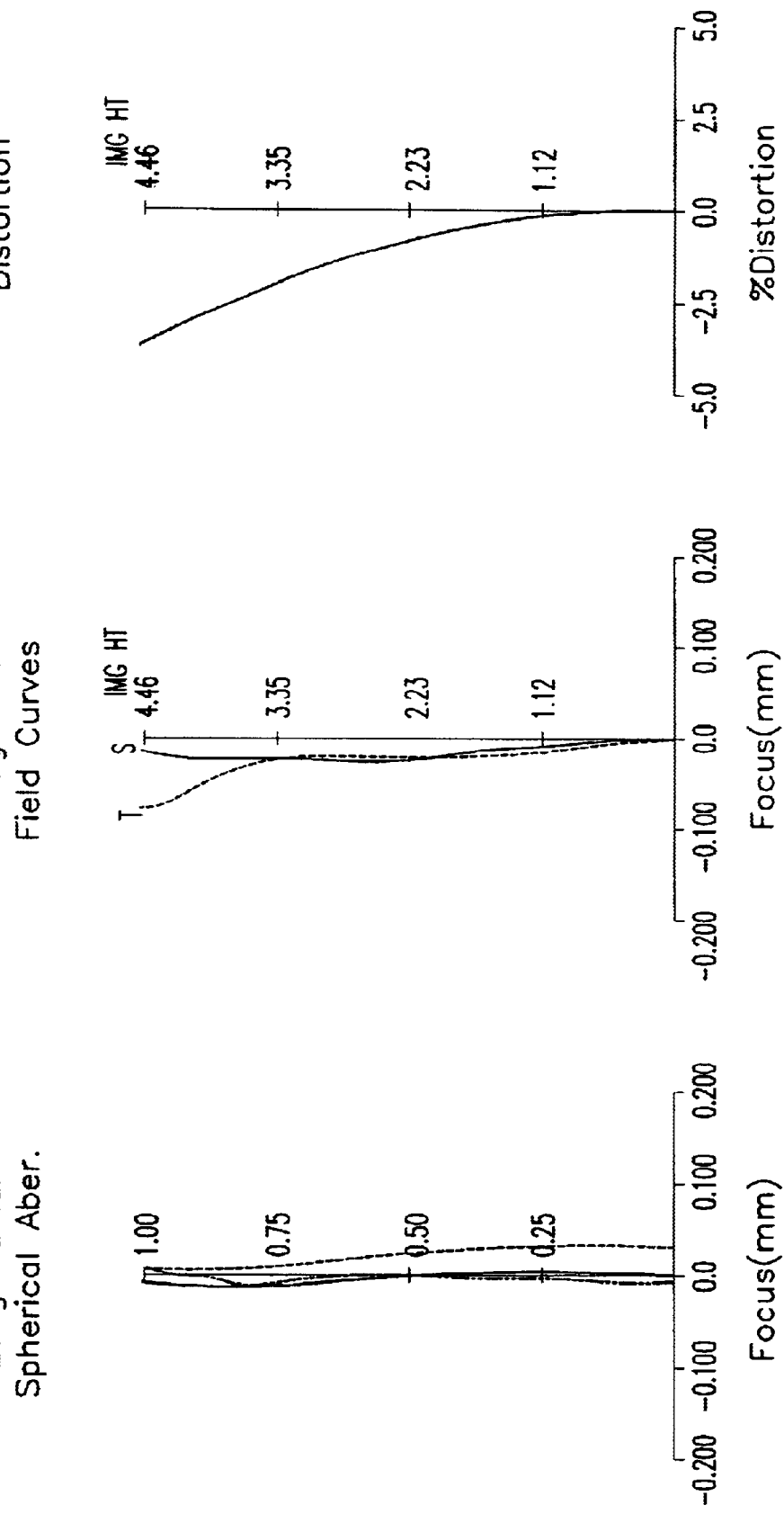
FIGS. 20a and 20b show aberration curves of the compact zoom lens system at a wide-angle position and at a telephoto position respectively.
Figure 20B:
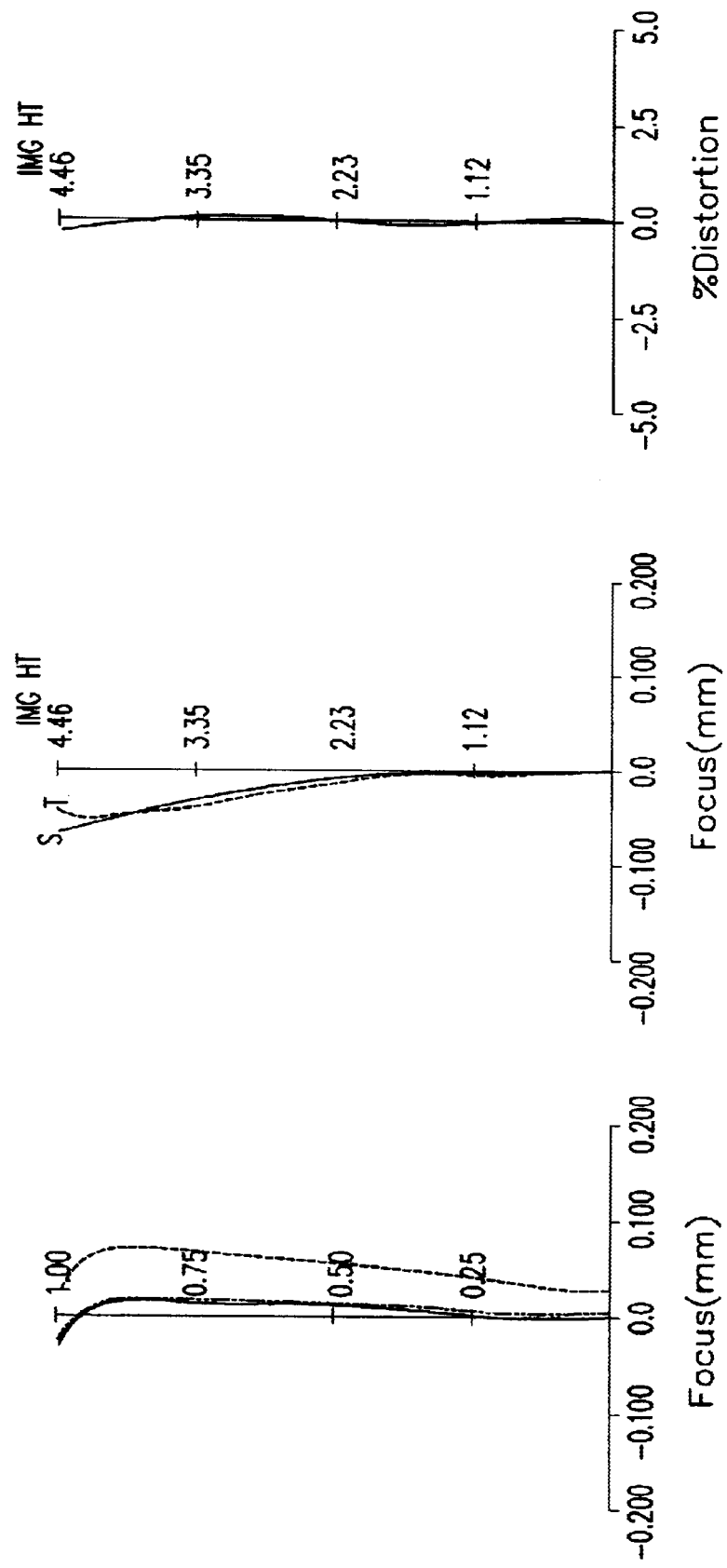

FIGS. 20a and 20b illustrate superior aberration characteristics of the tenth embodiment at a wide-angle position and at a telephoto position respectively.

A plurality of the embodiments having the above data satisfy the conditions 1, 2, 3, 4, 5, 6, 7, and 8 and values for conditions corresponding to the first to tenth embodiments are expressed in the following Table 31.

TABLE 31

| | First embodiment | Second embodiment | Third embodiment | Fourth embodiment | Fifth embodiment | Sixth embodiment | Seventh embodiment | Eighth embodiment | Ninth embodiment | Tenth embodiment |
|---|---|---|---|---|---|---|---|---|---|---|
| $L_{II}/\sqrt{f_w f_T}$ | 1.30 | 1.25 | 1.30 | 1.26 | 1.30 | 1.19 | 1.18 | 1.18 | 1.21 | 1.21 |
| $f_{III}/\sqrt{f_w f_T}$ | 2.44 | 2.57 | 2.25 | 2.16 | 2.26 | 2.18 | 2.06 | 2.01 | 1.98 | 1.88 |
| $t_{II}/\sqrt{f_w f_T}$ | 0.54 | 0.54 | 0.53 | 0.53 | 0.54 | 0.47 | 0.49 | 0.49 | 0.51 | 0.49 |
| $|f_{I(-)}/f_{I(+)}|$ | 0.45 | 0.41 | 0.45 | 0.47 | 0.45 | 0.42 | 0.45 | 0.45 | 0.44 | 0.44 |
| $f_T/f_W$ | 2.89 | 2.89 | 2.89 | 2.88 | 2.89 | 2.89 | 2.88 | 2.88 | 2.86 | 2.86 |
| $L_{III}/\sqrt{f_w f_T}$ | 0.002 | 0.005 | 0.000 | 0.000 | 0.000 | −0.07 | −0.07 | −0.07 | −0.09 | −0.09 |
| $D_{IIW}/f_W$ | 0.89 | 0.94 | 0.88 | 0.84 | 0.88 | 1.04 | 1.01 | 1.07 | 1.06 | 1.04 |
| $|n_{III} - n_{II2}|$ | 0.29 | 0.29 | 0.29 | 0.29 | 0.29 | 0.32 | 0.32 | 0.32 | 0.32 | 0.32 |

According to the above-described embodiments, a zoom lens system having a high magnification ratio of 2.8 to 3 can be provided with a compact structure. The compact zoom lens system can be used at a wide angle and has a telecentricity suitable for a pick-up device such as a CCD. The compact zoom lens system also has good optical performance with good chromatic aberration.

Other embodiments will be apparent to those skilled in the art from consideration of the specification and practice of the appended claims disclosed herein. It is intended that the specification and examples be considered as exemplary only, with a true scope and spirit being indicated by the following claims.

What is claimed is:

1. A compact zoom lens system, the lens system when viewed from an object side, comprising:

a first lens group of a negative refractive power, the first lens group comprising at least one lens of a negative refractive power and at least one lens of a positive refractive power;

a second lens group of a positive refractive power, the second lens group comprising a first lens of a positive refractive power, a second lens of a positive refractive power, and a third lens of a negative refractive power; and a third lens group of a positive refractive power, the third lens group comprising at least a lens of a positive refractive power;

wherein the first, the second, and the third lens groups move along an optical axis, and the zoom lens system satisfies the following conditions:

$$0.4 \le \frac{t_{II}}{\sqrt{f_W f_T}} \le 0.6 \text{ and } 2.8 \le \frac{f_T}{f_W} \le 3.0; \text{ and}$$

wherein
  $f_W$ represents a total focal length at a wide-angle position,
  $f_T$ represents a total focal length at a telephoto position, and
  $t_{II}$ represents a total thickness of the second lens group.

2. The zoom lens system of claim 1, wherein the zoom lens system further satisfies the following conditions:

$$1 \le \frac{L_{II}}{\sqrt{f_W f_T}} \le 1.5 \text{ and } 1.7 \le \frac{f_{III}}{\sqrt{f_W f_T}} \le 3; \text{ and}$$

wherein
  $f_{III}$ represents a focal length of the third lens group, and
  $L_{II}$ represents an amount of movement of the second lens group from the wide-angle position to the telephoto position.

3. The zoom lens system of claim 1, wherein the zoom lens system further satisfies the following condition:

$$0.4 \le \left| \frac{f_{I(-)}}{f_{I(+)}} \right| \le 0.6; \text{ and}$$

wherein
  $f_{I(-)}$ represents a focal length of a lens which has a negative refractive power in the first lens group, and
  $f_{I(+)}$ represents a focal length of a lens which has a positive refractive power in the first lens group.

4. The zoom lens system of claim 1, wherein the zoom lens system further satisfies the following condition:

$$0.25 \le |n_{II1} - n_{II2}| \le 0.4; \text{ and}$$

wherein
  $n_{II1}$ represents a refractive index of the first positive lens in the second lens group, and
  $n_{II2}$ represents a refractive index of the second positive lens in the second lens group.

5. The zoom lens system of claim 1, wherein the third lens group comprises at least one lens of a positive refractive power.

6. The zoom lens system of claim 1, wherein the first lens group and the second lens group comprise at least one aspherical surface.

7. The zoom lens system of claim 1, wherein two lenses among the first lens, the second lens, and the third lens of the second lens group are cemented.

8. A compact zoom lens system, the lens system when viewed from an object side, comprising:
  a first lens group of a negative refractive power;
  a second lens group of a positive refractive power, the second lens group comprising a first lens of a positive refractive power, a second lens of a positive refractive power, and a third lens of a negative refractive power, wherein two lenses among the first lens, the second lens, and the third lens are cemented; and
  a third lens group of a positive refractive power;
  wherein the first, the second, and the third lens groups move along an optical axis when zooming from a wide-angle position to a telephoto position, and the zoom lens system satisfies the following conditions:

$$0.8 \le \frac{D_{IIW}}{f_W} \le 1.2 \text{ and } 0.4 \le \frac{t_{II}}{\sqrt{f_W f_T}} \le 0.6; \text{ and}$$

wherein
  $f_W$ represents a total focal length at the wide-angle position,
  $f_T$ represents a total focal length at the telephoto position,
  $t_{II}$ represents a total thickness of the second lens group, and
  $D_{IIW}$ represents a distance between the second lens group and the third lens group at the wide-angle position.

9. The zoom lens system of claim 8, wherein the zoom lens system further satisfies the following conditions:

$$1 \le \frac{L_{II}}{\sqrt{f_W f_T}} \le 1.5 \text{ and } 1.7 \le \frac{f_{III}}{\sqrt{f_W f_T}} \le 3; \text{ and}$$

wherein
  $f_{III}$ represents a focal length of the third lens group, and
  $L_{II}$ represents an amount of movement of the second lens group from the wide-angle position to the telephoto position.

10. The zoom lens system of claim 8, wherein the first lens group includes at least one lens of a negative refractive power and at least one lens of a positive refractive power.

11. The zoom lens system of claim 8, wherein the zoom lens system further satisfies the following condition:

$$0.4 \le \left| \frac{f_{I(-)}}{f_{I(+)}} \right| \le 0.6; \text{ and}$$

wherein
  $f_{I(-)}$ represents a focal length of a lens which has a negative refractive power in the first lens group, and
  $f_{I(+)}$ represents a focal length of a lens which has a positive refractive power in the first lens group.

12. The zoom lens system of claim 8, wherein the zoom lens system further satisfies the following condition:

$$0.25 \le |n_{II1} - n_{II2}| \le 0.4; \text{ and}$$

wherein
  $n_{II1}$ represents a refractive index of the first positive lens in the second lens group, and
  $n_{II2}$ represents a refractive index of the second positive lens in the second lens group.

13. The zoom lens system of claim 8, wherein the third lens group comprises one lens of a positive refractive power.

14. The zoom lens system of claim 8, wherein the first lens group and the second lens group comprise at least one aspherical surface.

15. A compact zoom lens system, the lens system when viewed from an object side, comprising:
  a first lens group of a negative refractive power;
  a second lens group of a positive refractive power, the second lens group comprising a first lens of a positive refractive power, a second lens of a positive refractive power, and a third lens of a negative refractive power; and a third lens group of a positive refractive power;

wherein the first, the second, and the third lens groups move along an optical axis when zooming from a wide-angle position to a telephoto position, and the zoom lens system satisfies the following conditions:

$$-0.2 \leq \frac{L_{III}}{\sqrt{f_W f_T}} \leq 0.1,$$

$$0.8 \leq \frac{D_{IIW}}{f_W} \leq 1.2 \text{ and}$$

$$0.4 \leq \frac{t_{II}}{\sqrt{f_W f_T}} \leq 0.6, \text{ and}$$

wherein $f_W$ represents a total focal length at the wide-angle position, $f_T$ represents a total focal length at the telephoto position, $t_{II}$ represents a total thickness of the second lens group, $D_{IIW}$ represents a distance between the second lens group and the third lens group at the wide-angle position, $L_{II}$ represents an amount of movement of the second lens group from the wide-angle position to the telephoto position, and $L_{III}$ represents an amount of movement of the third lens group from the wide-angle position to the telephoto position.

16. The zoom lens system of claim 15, wherein the zoom lens system further satisfies the following conditions:

$$1 \leq \frac{L_{II}}{\sqrt{f_W f_T}} \leq 1.5 \text{ and}$$

$$1.7 \leq \frac{f_{III}}{\sqrt{f_W f_T}} \leq 3; \text{ and}$$

wherein $f_{III}$ represents a focal length of the third lens group, and $L_{II}$ represents an amount of movement of the second lens group from the wide-angle position to the telephoto position.

17. The zoom lens system of claim 15, wherein the first lens group includes at least one lens of a negative refractive power and at least one lens of a positive refractive power.

18. The zoom lens system of claim 15, wherein the zoom lens system further satisfies the following condition:

$$0.4 \leq \left| \frac{f_{I(-)}}{f_{I(+)}} \right| \leq 0.6; \text{ and}$$

wherein $f_{I(-)}$ represents a focal length of a lens which has a negative refractive power in the first lens group, and $f_{I(+)}$ represents a focal length of a lens which has a positive refractive power in the first lens group.

19. The zoom lens system of claim 15, wherein the zoom lens system further satisfies the following condition:

$$0.25 \leq |n_{II1} - n_{II2}| \leq 0.4; \text{ and}$$

wherein $n_{II1}$ represents a refractive index of the first positive lens in the second lens group, and $n_{II2}$ represents a refractive index of the second positive lens in the second lens group.

20. The zoom lens system of claim 15, wherein the third lens group comprises at least one lens of a positive refractive power.

21. The zoom lens system of claim 15, wherein the first lens group and the second lens group comprise at least one aspherical surface.

22. The zoom lens system of claim 15, wherein two lenses among the first lens, the second lens, and the third lens of the second lens group are cemented.

* * * * *